United States Patent
White et al.

(10) Patent No.: US 11,861,623 B2
(45) Date of Patent: Jan. 2, 2024

(54) TECHNICAL FALLBACK INFRASTRUCTURE

(71) Applicant: Block, Inc., San Francisco, CA (US)

(72) Inventors: Michael Wells White, San Francisco, CA (US); Charles Nicholson, Lafayette, CA (US); David Terra, San Francisco, CA (US); Jason Holmes, San Francisco, CA (US); Martin Mroz, San Francisco, CA (US)

(73) Assignee: Block, Inc., Oakland, CA (US)

( * ) Notice: Subject to any disclaimer, the term of this patent is extended or adjusted under 35 U.S.C. 154(b) by 121 days.

(21) Appl. No.: 17/135,816

(22) Filed: Dec. 28, 2020

(65) Prior Publication Data

US 2021/0117975 A1 Apr. 22, 2021

Related U.S. Application Data

(60) Division of application No. 16/214,031, filed on Dec. 7, 2018, now Pat. No. 10,949,858, which is a
(Continued)

(51) Int. Cl.
*G06Q 20/40* (2012.01)
*G06Q 20/20* (2012.01)
(Continued)

(52) U.S. Cl.
CPC ......... *G06Q 20/409* (2013.01); *G06Q 20/102* (2013.01); *G06Q 20/204* (2013.01);
(Continued)

(58) Field of Classification Search
None
See application file for complete search history.

(56) References Cited

U.S. PATENT DOCUMENTS

| 10,163,107 B1 | 12/2018 | White et al. |
| 2013/0173455 A1* | 7/2013 | Adams ............... H04B 5/00 705/39 |

(Continued)

FOREIGN PATENT DOCUMENTS

| JP | 2004054556 A | * | 2/2004 | |
| WO | WO-2015095599 A1 | * | 6/2015 | ........... G06Q 20/18 |
| WO | WO-2016083778 A1 | * | 6/2016 | ......... G06Q 20/3224 |

OTHER PUBLICATIONS

Notice of Allowance dated Aug. 15, 2018, for U.S. Appl. No. 15/087,698, of White, M.W., et al., filed Mar. 31, 2016.
(Continued)

*Primary Examiner* — Ariel J Yu
(74) *Attorney, Agent, or Firm* — Lee & Hayes P.C.

(57) ABSTRACT

Examples, methods and systems described herein may include determining, by a payment processing system, whether a second payment mechanism may be used to perform a payment transaction when a first payment mechanism is preferred and/or when the first payment mechanism has failed. Determining to use the second payment mechanism can be based on (i) an analysis of a communication status indicator received from a point-of-sale (POS) terminal that indicates which payment mechanisms are capable of
(Continued)

communicating with the POS terminal, (ii) data received from the POS terminal that is associated with a read of a payment object, and/or (iii) an allowance criterion.

20 Claims, 7 Drawing Sheets

Related U.S. Application Data continuation of application No. 15/087,698, filed on Mar. 31, 2016, now Pat. No. 10,163,107.

(51) Int. Cl.
*G06Q 20/10* (2012.01)
*G06Q 20/34* (2012.01)
*G06Q 20/36* (2012.01)
*G07F 7/10* (2006.01)

(52) U.S. Cl.
CPC ....... *G06Q 20/341* (2013.01); *G06Q 20/3674* (2013.01); *G06Q 20/405* (2013.01); *G07F 7/1083* (2013.01)

(56) References Cited

U.S. PATENT DOCUMENTS

| | | | |
|---|---|---|---|
| 2014/0019352 A1* | 1/2014 | Shrivastava | G06Q 20/326 705/41 |
| 2015/0073983 A1* | 3/2015 | Bartenstein | G06Q 20/325 705/41 |
| 2015/0074366 A1 | 3/2015 | Calciu et al. | |
| 2015/0081557 A1 | 3/2015 | Kinfoil et al. | |
| 2015/0149357 A1* | 5/2015 | Ioannidis | G06Q 20/3224 705/44 |
| 2015/0277967 A1 | 10/2015 | Calciu et al. | |
| 2015/0339659 A1* | 11/2015 | Ballesteros | G06Q 20/38215 705/76 |
| 2017/0098209 A1 | 4/2017 | Laracey et al. | |
| 2019/0287108 A1 | 9/2019 | White et al. | |

OTHER PUBLICATIONS

Notice of Allowance dated Oct. 28, 2020, for U.S. Appl. No. 16/214,031, of White, M.W., et al., filed Dec. 7, 2018.

* cited by examiner

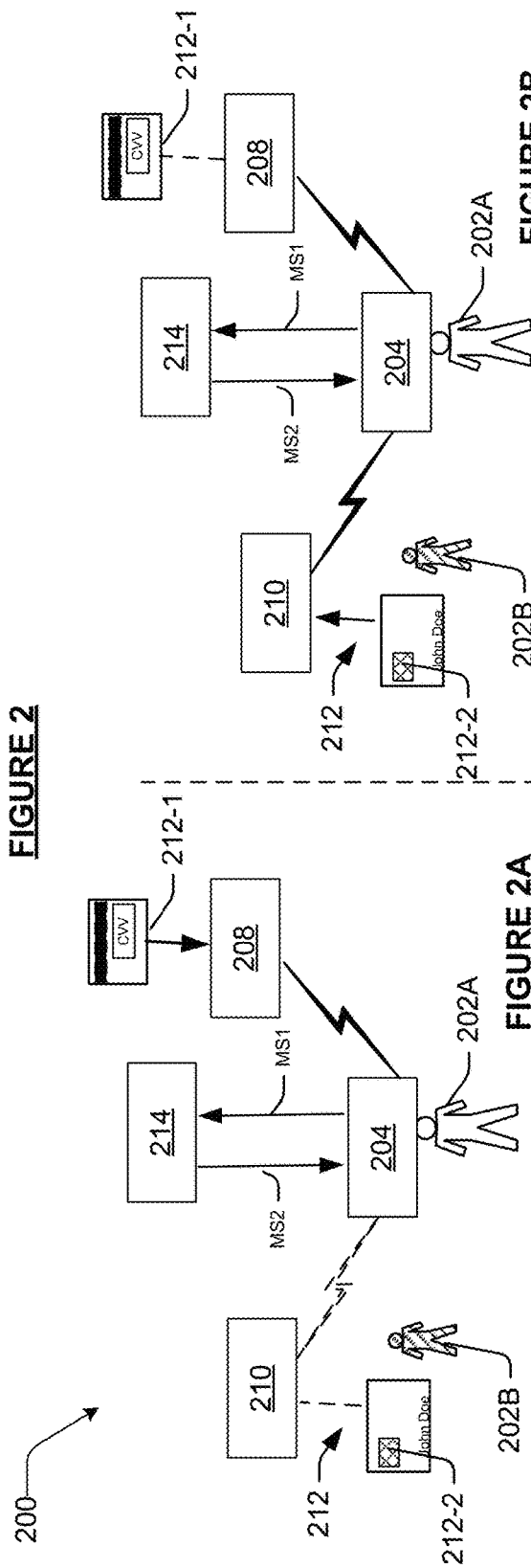
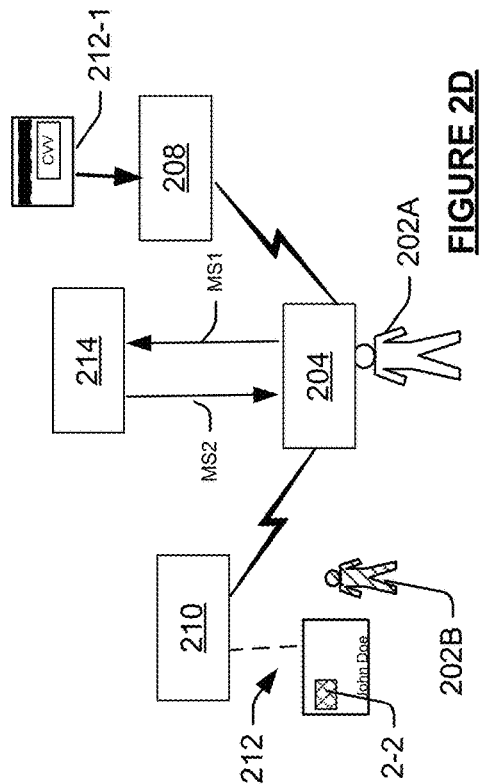
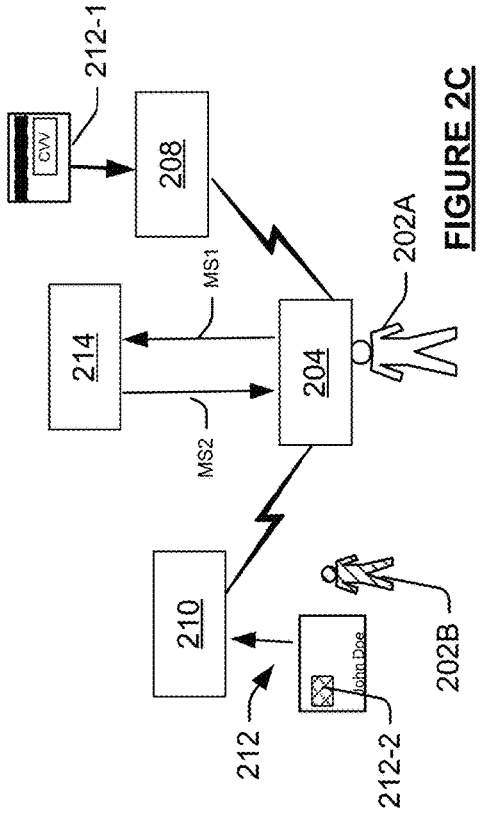
FIGURE 2

TECHNICAL FALLBACK INFRASTRUCTURE

This Application claims priority to U.S. patent application Ser. No. 16/214,031, filed Dec. 7, 2018, which is a continuation of U.S. patent application Ser. No. 15/087,698, which was filed Mar. 31, 2016 and which issued as U.S. Pat. No. 10,163,107, each of which is incorporated herein by reference.

TECHNICAL FIELD

A fallback transaction normally occurs when a Europay-MasterCard-Visa (EMV) or chip card, presented at a chip terminal, cannot be read due to a technical issue with the chip which results in the technology "falling back" to a magnetic stripe transaction. In some situations, a fraudster may create a counterfeit card with an intentionally damaged chip in order to invoke this scenario. For this reason, fallback transactions are deemed risky by the payments industry. Since the issuer of the chip card holds liability on fallback transactions, they may choose to decline such transactions when they are sent for authorization.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

FIG. 2 is an illustration of the different ways (FIGS. 2A-2D) in which communication is established between the POS terminal and card readers, and subsequent treatment of a payment transaction based on the status of communication, according to an embodiment of the present subject matter.

DETAILED DESCRIPTION

Figure 1:
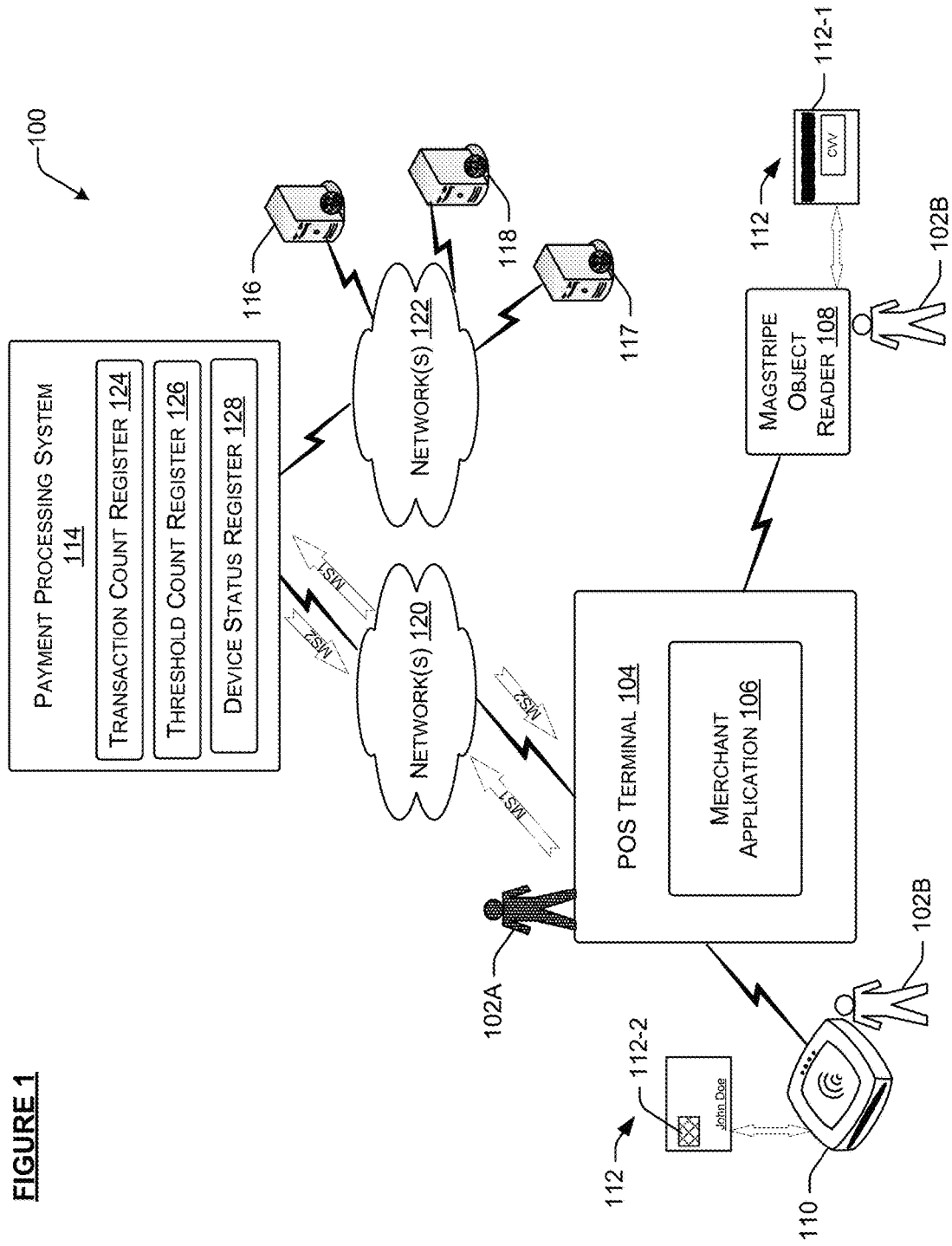
FIG. 1 is an example architecture of a payment communication system for enabling point-of-sale (POS) transactions between merchants and customers particularly in technical fallback scenarios, according to an embodiment of the present subject matter.

Some implementations described herein include methods and systems that enable sellers to implement a technical fallback infrastructure to authorize a payment transaction without or minimal seller intervention, during a technical fallback scenario. Technical fallback occurs when there is an issue with an EMV card or the point of sale (POS) terminal that prevents the two from successfully communicating. If the terminal cannot read the chip of the EMV card, the transaction can switch or fallback to a magnetic stripe or key-entered transaction. Depending on how the terminal is configured, multiple attempts to read the EMV card may be required before fallback is allowed.

The disclosed infrastructure is particularly helpful in implementing technical fallback in a POS system with distributed hardware payment components, where the POS system includes components, such as a payment object reader for an EMV card, a payment object reader for a magnetic stripe card, and a POS terminal to process a payment transaction received at either of the payment object readers.

As disclosed herein, the distributed POS system includes a payment object reader to read data of an integrated circuit card, such as an EMV smart card dipped into a reader, where the reading of the card requires adherence to a multiple step protocol (EMV standard), the reader is hereinafter referred to as "EMV card reader." The POS system also includes another payment object reader, separate from the EMV card reader, to read data off of the payment object having one or more magnetic stripes that is swiped in the second payment object reader, the reader is hereinafter referred to as "magstripe object reader." Chip-based payment cards contain embedded microprocessors that provide strong transaction security features and other application capabilities not possible with traditional mag-stripe cards.

In the foregoing set-up, the magstripe object reader is unaware whether an EMV card reader is connected to the communication device. As such, conventional mechanisms of addressing technical fallback cannot be applied to arrangements where the card-reading capabilities are distributed across multiple readers. The problem being addressed in the current disclosure is better understood in light of traditional systems and methods of technical fallback implementation described below.

Traditionally, a single point-of-sale (POS) terminal is dedicated to accept both magnetic stripe cards and EMV cards that are introduced through separate entry points or interfaces depending on the type of card. EMV card payments are initiated by an integrated-circuit chip ("chip") on the card, which is read by the EMV interface of the terminal. The magstripe card payments are initiated by a magnetic stripe on a card, which is read by the magstripe interface of the terminal. The EMV and magstripe reading technology enables backwards compatibility so that customers can continue to transact in non-EMV environments thereby helping merchants and customers who are not going to be adopting EMV technology or are in the process of transitioning from magstripe-based technology to EMV-based technology. Additionally, the magstripe object reader also accepts magstripe cards with faulty chips thereby supporting technical fallback if the EMV enabled chip is unreadable. Technical fallback is the exception process that kicks in when the POS terminal cannot read the chip of the EMV card due to technical/malfunction issues with the chip or even the EMV card interface, unbeknownst to the merchant. It is called fallback because when the chip cannot be read, the terminal decides to fall back on the magnetic stripe data so that the transaction can proceed. Any other scenario is not fallback scenario. For example, if the merchant is using a phased approach to EMV deployment and the merchant chooses to override the chip service code on the card, then, pursuant to the EMV protocol and payment network rules, the terminal must reflect the terminal entry capability as magnetic stripe only or risk consequences arising from incorrect tagging of fallback.

When an EMV card read fails, the terminal displays a message instructing the customer to re-insert the card a number of times (generally, two to three). If the EMV card still cannot be read, the convention dictates to follow EMV hierarchies of risk management, i.e., the next lowest risk transaction is to use the magnetic stripe swipe. Thus, the magnetic stripe, rather than the chip data, of the card is read by the same terminal but through the magnetic stripe interface. And if that fails as well, the merchants can resort to manual key entry of the card information. In chip-read fail scenarios, the transaction is treated as a technical fallback.

In traditional methods, technical fallback is determined and implemented in the following manner: when a card is inserted at a chip-enabled ATM or POS terminal, the POS terminal determines whether the card was created as a magnetic stripe card or as an EMV card. The way this is done varies depending on the type of card reader but generally, the POS terminal reads the chip and interrogates the first byte of the service code in track 2, which indicates whether the card is a magnetic stripe card or an EMV card. If the service code indicates that the card is an EMV card, the terminal attempts to communicate with the chip of the EMV card. Assuming this communication is successful, the chip of the EMV card and the POS terminal exchange the rest of the card information, and if all goes well, the transaction proceeds as an EMV transaction.

But, assume that even though the chip was detected successfully, the terminal is not able to communicate with the chip on the EMV card. As mentioned before, this may happen if the chip on the EMV card has been damaged, or the card reader in the terminal is not working properly. In this case, the terminal requests the customer to re-try the EMV card, generally three times. The POS terminal detects and keeps a count of the times the EMV card is dipped in an EMV interface by saving the count in a local counter. The POS terminal can do so because the card data obtained during each read is unencrypted, enough to indicate whether an EMV card was read or a magnetic stripe is read. Based on the information in the local counter, the POS terminal makes a decision, again locally, whether to implement technical fallback or not. Of course, these technical fallback methods can only be applied when the card read is unencrypted, the counter is locally available, and the POS terminal is an integrated device supporting payments made by magnetic stripe cards and EMV cards.

It is worth mentioning that in technical fallback situations, the EMV security protocols are bypassed and the security of the transaction is limited to the magnetic stripe. While technical fallback can indicate a faulty card reader or a malfunctioning chip card, it can also indicate an attempt to circumvent EMV security measures. For example, fraudsters can intentionally disable the chip in an attempt to bypass the chip-and-PIN security measures. For this reason, unattended payment terminals having both magnetic stripe and EMV reading capabilities are particularly susceptible to fraudulent attempts that incorrectly implement technical fallback particularly in cases where data is unencrypted.

To this end, the disclosed methods and systems define a POS system that includes separate readers depending on the type of payment card and a POS terminal to which the readers connect. Further, the readers are configured to encrypt the card information and may or may not allow decryption of card data at the terminal level. In such scenarios, the card information, along with decision making related to the card type—determination whether it is a magnetic stripe card or an EMV card—is passed onto the cloud or central server where the information is stored and decrypted. Further, even though the terminal or reader can keep a count of the number of failed dips or the magstripe swipes, the PPS can collate and analyze the information from disparate sources to determine whether or not technical fallback.

The central server, also referred to as the payment processing system (PPS) hereinafter communicates with at least the POS terminal and in some scenarios, with all the entities of the payment flow, including the readers and the customer's mobile devices to determine whether or not technical fallback should be implemented. The payment processing system receives encrypted card data through various intermediary entities, like the POS terminal and readers, thus ensuring that the data is not comprised in anyway, which discourages fraudsters from bypassing security measures. Further, the mechanisms to count the successful and failed attempts can be both local or at the server level. However, since the entities, such as the card readers and the terminal, are distributed, decision-making and mechanisms related to institution of technical fallback are determined by the PPS. This is because the magnetic stripe reader is unaware of whether the chip card reader is connected to the terminal, and the service code (which reveals whether the card has a chip or a magstripe) and the point-of-sale entry code (which indicates whether the card was swiped or dipped) are encrypted parameters, extractable at the server level.

The disclosed methods and systems describe treatment of a payment transaction when the EMV reader fails to read the chip of an EMV card fails one or more times and the customer or the merchant attempts a magnetic stripe payment instead. So, a payment transaction involves a customer providing a payment card, such as a credit card or debit card, to pay for a product or service that the customer purchases from a merchant. Assume that the credit card includes both magnetic stripes to allow for magnetic stripe payment and EMV chip to allow for chip payments. The customer approaches the merchant's POS system having a separate EMV card reader and a magstripe object reader, both connected to a POS terminal. To this end, the POS terminal updates an internal connection status indicator to indicate which readers are actually connected via a communication network whether physical or logical to the POS terminal. The customer attempts to dip the card in an EMV card reader, where the card read process includes encrypting data read off the payment object obtained from the magnetic stripe card reader or the EMV card reader, where the encrypted data at least includes an encrypted value of a service code indicating whether the payment object's stripe was swiped or chip was inserted. Each time the card is dipped, the encrypted data is passed onto the PPS, which detects by reading the service code that a chip is being dipped. Due to faulty chip, the card information may be missing even though the reader still detects an entry of an object. Thus, the PPS requests the merchant or customer to re-attempt the dip action. If the EMV reader fails to read the chip three times in a row, the POS terminal detects a magstripe object reader connected to it, for example based on the internal connection status indicator. Accordingly, the POS terminal through the payment processing system, allows the merchant or customer to swipe the card as if it were a magnetic stripe card payment transaction. The POS terminal generates a payment request in response to the swiping action and based on the data collected from the credit card. The POS terminal electronically sends the payment request to the PPS over an available network for authorization. The PPS registers such as a transaction as an EMV transaction in fallback and sends it to a payment card processor for authorization.

From there, the payment card processor, with or without performing an analysis of the payment request, routes the request to a card network, e.g., Visa® or MasterCard®, which in turn sends the request to the card issuer, e.g., a bank, for approval, the request indicating that this was a technical fallback transaction. Usually, after a short delay, the POS terminal may receive an indication of whether the payment card has been approved (i.e., authorized) or declined (i.e., failed to authorize) for an amount of the transaction, such as a cost of the good or service. Assuming the card issuer approves the transaction, the payment card processor causes funds to be transferred from the buyer's bank account to a merchant's bank account, and optionally creates a receipt indicating successful processing of a payment transaction, which is sent to a buyer's phone.

In some cases, the PPS tracks the technical fallback events at each merchant location or at merchant locations in a particular neighborhood. This is to determine whether the technical fallback events are a result of faulty chips or faulty readers. For example, the PPS determines whether technical fallback events have happened within a certain time period on the same reader but with different customers or payment cards, thus indicating a possibility that the reader may be defective. In some cases, a higher ratio of technical fallback events in a particular neighborhood can indicate the same customer or a group of customers attempting to force technical fallback by tricking the EMV card reader through a defective EMV card or another object. In some cases, the PPS, POS terminal or even the reader may count the failed dip attempts and assign a threshold number of the number of times at the lapse of which technical fallback treatment is applied for a specific payment card or customer. At the lapse of the threshold number of such technical fallback events, the PPS chooses to either reject the transaction altogether or generate a message to try another method of payment.

The systems and methods described herein support establishment of a technical fallback across multiple hardware devices, especially when the EMV and magnetic stripe reading capabilities are separate. As described above, the disclosed technology enables the technical fallback decision-making to be moved to the server level with encryption of data at the reader level thus reducing fraudulent attempts at the reader level.

While the description hereinafter discusses a certain number of hardware devices, it will be understood that any number of devices may form a payment system. Further, while the data is encrypted at the reader level, the data may also be unencrypted and the counter that counts the number of successful or failed attempts can be local.

While the embodiments described herein may relate to technical fallback for EMV and magstripe functionalities of POS terminals, including self-checkout terminals, it will be understood that the embodiments can be extended to any other kind of payment hierarchy, such as between NFC and EMV, magstripe and manual entry, and so on.

Various embodiments and implementations of the disclosed payment technology are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

As used herein, a merchant may include any business engaged in the offering of goods or services for acquisition by buyers. Actions attributed to a merchant may include actions performed by owners, employees, or other agents of the merchant and thus no distinction is made herein unless specifically discussed. In addition, as used herein, a customer or buyer may include any entity that acquires goods or services from a merchant, such as by purchasing, renting, leasing, borrowing, licensing, or the like. Hereinafter, goods and/or services offered by merchants may be referred to as items. Thus, a merchant and a buyer may interact with each other to conduct a transaction in which the buyer acquires an item from a merchant, and in return, the buyer provides payment to the merchant, for example through a payment instrument.

As used herein, a 'payment transaction' or simply 'transaction' may include a financial transaction for the acquisition of goods and/or services that is conducted between a buyer and a merchant. For example, when paying for a transaction, the buyer can provide the amount that is due to the merchant using a payment instrument or even a payment proxy. In other cases, the payment transaction includes transfer of money from one party to another for any number of reasons. Thus, while the description refers to as buyer and merchant as parties to the payment transaction, it will be understood that the parties can be a sender and a recipient, a land lord and a renter, a bank and a bank customer, a first friend and a second friend, and so on.

The term 'payment card' or 'payment object' refers to a payment mechanism that includes a conventional debit card, a conventional credit card, a prepaid gift card, or the like, a smartcard that has an embedded integrate circuit chip (e.g., Europay-MasterCard-visa (EMV) card), a proxy card, or any card that functions as a combination of any of these mechanisms. The term 'proxy card' as used herein refers to a card that may or may not bear a card number or an account number that appears to be that of a real credit or debit card account (i.e., it is in the correct format), but where that card/account number is actually only a proxy for the buyer's real card/account number. Additionally, the payment card used in the example above is a specific type of a financial instrument. Other types of financial instruments, other than the payment card, can be used to initiate the transfer of funds. A financial instrument can be a software instrument or virtual instrument, such as a virtual wallet. Other examples of payment card may also include a prepaid card, a gift card, a rewards card, a loyalty points' card, a frequent flyer miles card, a check, cash, or any other kind of payment instrument that holds financial value or provides a promise to pay at a later time. Payment card may also include a payment object, such as an electronic device configured to initiate contactless payment transactions, e.g., a key fob, a mobile device (such as a mobile device having an NFC tag). And finally, the payment object can also be a payment proxy having a syntax of a monetary indicator followed by a string of alphanumeric characters or in general, any identifier that is representative of the buyer or merchant's financial account. The payment proxy can be used in the context of and within a webpage as part of the web address, a social networking handle or username, a forum, a messaging application, and so on. The payment proxy can also be a biometric payment instrument. The term 'biometric payment instrument' is a type of payment object or financial instrument that is biometrically identifiable and initialized by a biometric characteristic, such as a person's finger (e.g., for fingerprint recognition), face, iris or retina, heartbeat, voice, etc.

The term "landing page," as used here, refers to a virtual location identified by a personalized location address that is dedicated to collect payments on behalf of a recipient associated with the personalized location address. The personalized location address can include the payment proxy discussed above. In some embodiments, the landing page is identified by a uniform resource locator (URL) that includes a payment proxy, where the URL is accessible through a web browser application installed on a client device of the sender. For example, the URL is www . . . com/$charityName. In another example, the URL is www . . . com/$aaron. In some embodiments, the landing page is identified by a graphical user interface (GUI) of a mobile payment application installed on a client device of the sender. For example, the GUI of the mobile payment application is dedicated to $charityName, where there can be multiple GUIs each dedicated to a different payment proxy.

The landing page is generated by the payment service system to receive, e.g., collect, one or more payments on behalf of the recipient from one or more senders. The sender can access the landing page, e.g., by entering a URL into a web browsing application installed on the sender's client device. Upon navigating to the URL, the sender can simply enter a payment amount, e.g., in a web form field, and send the money, e.g., by selecting a "Pay" action button displayed on the website. In another example, the sender can access the landing page, e.g., by selecting a GUI within a mobile payment service application, where the GUI, e.g., is labeled with the payment proxy $aaron. The sender can further enter a payment amount at the GUI and send the money, e.g., by selecting a "Pay" action button displayed on the GUI.

The term "forum," as used here, refers to a media channel (e.g., a social networking website, a microblog, a blog, etc.) that enables user interaction and engagement through comments, posts, and/or messages. The forum can be employed by a service provider to provide various services to users of the forum, e.g., create messages, post comments, interact with one another, etc. Within a forum context, a user can indicate an intent to transfer money by specifying a payment proxy in a message that the user submits, e.g., "posts," on a particular forum, where that payment proxy carries the syntax of the monetary indicator preceding one or more alphanumeric characters. For example, the user posts a message "I support $funnyguy311 with $10." In such an example, the payment service system detects the user's intent to send money, e.g., $10, to "$funnyguy311" and initiates the transfer of money upon identification of a recipient financial account associated with "$funnyguy311." The monetary indicator can correspond to various currencies, e.g., dollar ($), euro (€), pound (£), yuan (¥), etc. Although use of the dollar monetary indicator ($) is used herein, it is to be understood that any currency symbol could equally be used.

The term "merchant application," "registration application" or "mobile payment portal" as used here, refers to any messaging application that enables communication between users (e.g., sender and recipient of a message) over a wired or wireless communications network. A service provider that delivers a communication service to users, e.g., chat capability, can employ the messaging application. The messaging application can include, for example, a text messaging application for communication between phones (e.g., conventional mobile telephones or smartphones), or a cross-platform instant messaging application for smartphones and phones that use the Internet for communication. Within a messaging application context, a user can indicate an intent to transfer money by specifying a payment proxy in a TO field of, e.g., a message, that the user inputs within the messaging application. For example, the user enters into the TO field "$redcross." In another example, the user enters into the TO field "$aaron." Once the user enters a payment proxy, or input, into the TO field, the user can enter a message in a body of the message, e.g., "Here is $10," and send the message. In various embodiments, the message can be a text message, a chat message, an email message, or indeed any other type of message that is capable of being exchanged between computing devices. Although this specification may employ text messages as an example, it is to be understood that the payment proxy technology may employ any of these types of messages. Upon receiving an indication to send (e.g., after detecting that the user has clicked "Send"), the messaging application transmits a message, e.g., the text message to a messaging application computer system ("messaging application system"). The messaging application system detects that the input in the TO field of the message it has received includes a syntax of a monetary indicator preceding one or more alphanumeric characters. In response, the messaging application system forwards the text message to the payment service system for processing. The payment service system identifies a recipient associated with the input (or payment proxy) that is derived from the TO field, and further identifies a recipient financial account associated with that recipient. Upon identification of the recipient financial account, the payment service system initiates the transfer of money.

With a number of cardholder payment options (e.g., magnetic stripe, contact chip and contactless chip) and methods in development (e.g., mobile and cloud-based), the card issuing institutions bake various kinds of information in the payment object. This information includes a card number, an expiry date, and a service code. A card number is a sequence of digits that identifies a bank that issued the credit card and an account number that is specific to the cardholder. In some circumstances, a card number is also referred to as a "primary account number" (PAN). An expiry date of a credit card indicates a date when the credit card expires. A service code of a credit card indicates how the cardholder is permitted to use the credit card.

The transaction attributes embedded in the card information reveal various aspects about the transaction, for example, where the transaction was performed, the entry point, whether the transaction was manual entry or not, and so on. Some transaction attributes are now defined:

Card Verification Value (CVV)—a unique and distinct code that verifies that a card is in the possession of the cardholder—in conjunction with other authentication factors to prevent counterfeit, primary account number (PAN) key-entered and card-not-present fraud. The CVV can be used to detect a counterfeit card in cases where a magnetic stripe has been encoded or re-encoded with valid account information from other sources. Issuers require that all cards—including emergency replacement cards—are encoded with the CVV, which is calculated by applying a cryptographic algorithm to the encoded account information (card account number, expiration date and service code). In addition, to prevent fraud from occurring, variations of CVV exist across the different interfaces of payment transactions as described herein. The CVV can be associated a first card verification value (CVV1) and a second card verification value (CVV2). An issuing bank may generate the CVV1 of a credit card by digitally encrypting the card number, the expiry date, and the service code of the credit card using a secret encryption key. The issuing bank may generate the CVV2 of a credit card by digitally encrypting the same information using a different encryption method. The CVV1 of a credit card, along with the card number, expiry date, and service code of the credit card, is typically stored in a magnetic stripe on the back of the credit card. Because the CVV1 of the credit card is stored in the magnetic stripe of the credit card, the CVV1 of the credit card is not visible to the cardholder. The CVV2 of a credit card is typically printed on the back or front of the credit card such that the CVV2 of the credit card is visible to the cardholder. Magnetic-Stripe Interface—CVV: A unique three-digit code encoded in Track 1 and the Discretionary Data field in Track 2 of the magnetic stripe or the chip magnetic-stripe image (MSI). Card-Not-Present Interface—CVV2: As mentioned above, CVV2 is a fraud prevention technique used in the card-not-present environment to ensure the card is valid. The CVV2 is a three-digit value printed on the back of cards which can be submitted by the merchant as part of the authorization request. The CVV2 is different than the CVV contained on the magnetic stripe and is validated using a different calculation. CVV2 failures may indicate fraudulent use of an account number where the fraudster does not have the card in hand, and as a result, does not know the CVV2 value. Contactless Interface—Dynamic Card Verification Value (dCVV): An authentication technique on the magnetic-stripe data version of contactless transactions used to reduce the threat of data compromises and counterfeiting. Chip Interface—Integrated Card Verification Value (iCVV): A tool used to protect against data being copied from a chip card and applied to the magnetic stripe of a counterfeited plastic card. Chip Cryptogram: A cryptogram included in the authorization message of chip-based transactions using chip data. The cryptogram should be verified to ensure authenticity of the chip card.

The card information can also include references to a point-of-sale entry code, which indicates whether the payment object was swiped or dipped or introduced in any other way. The point-of-sale (POS) entry code sent in the transaction tells the issuer how the transaction data was acquired at the merchant. Because the POS entry code identifies the acceptance channel in combination with other authorization parameters (e.g., the POS condition code), verification of this information is an essential step to identifying and preventing fraud. The most common POS entry modes include: •01—Manual key entry, 02 or 90—Magnetic stripe read, 05 or 95—Chip read, 07—Contactless, using chip data rules, 91—Contactless, using magnetic-stripe data rules.

The Service Code is another transaction attribute that may be useful in segregating magstripe and EMV based payments. The service code is a sequence of digits that—taken as a whole—allows the issuer to define various services, differentiates card usage in international or domestic interchange, designates PIN and authorization requirements and identifies card restrictions. The use of a service code is applicable to all Visa products. Typical service code examples are: 101—International-use credit and debit cards, 120—International-use credit and debit cards where PIN is required, 201—EMV chip credit card, 221—EMV chip debit card, 601—Domestic-use EMV chip credit and debit cards. Service codes of 000 or 999 are not valid as identifiers of the card capability or usage, but rather are used in the calculation of CVV2 or iCVV. Therefore, service codes of 000 or 999 should not be encoded on a magnetic stripe. Thus, an issuer would be aware of scenarios in which either 000 or 999 has been encoded on the magnetic stripe of counterfeit cards, resulting in issuer fraud losses.

CVV values, POS entry codes and service codes should be used in combination to identify logical conflicts and mitigate preventable counterfeit and card-not-present fraud and also implement technical fallback as described herein. Issuers need to ensure that the POS entry code identifies a supported payment interface and that the service code is valid. After reviewing an authorization request, issuers incorporate the corresponding CVV result as part of the decision process. When an issuer validates the POS entry mode, the appropriate service code and the corresponding CVV, they can automatically validate whether the transaction is an appropriate technical fallback transaction.

It is noted that the technical fallback technology is equally applicable in other embodiments to various other content providers and various other types of providers, such as financial service providers or to any application that involves communication of messages between users, and that the technical fallback technology is not limited to a certain number of readers or set-up of POS system.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Turning now to the Figures, FIG. 1 is an example architecture of payment communication system 100 for enabling point-of-sale (POS) transactions between merchants 102A and customers 102B particularly in technical fallback scenarios. In the example of FIG. 1, the payment communication system 100 includes a point-of-sale (POS) system that further includes a POS terminal 104 (associated with a merchant 102B) executing an instance of a merchant application 106 and a plurality of payment object readers, such as a magstripe object reader 108 and an EMV object reader 110 connected to the POS terminal 104. The system 100 further includes a payment processing system 114 ("PPS 114"), one or more bank computing device(s) 116, an issuer of the payment object 117, and a card payment network computing device(s) 118; all of which are connected via a communications network(s) 120 and 122, according to an embodiment of the present subject matter.

The customer 102B can use any of a variety of payment objects 112, such as credit cards, debit cards, etc., when participating in POS transaction with a merchant 102A. In some embodiments, payment objects 112 can include one or more magnetic stripes 112-1 with customer financial information stored thereon. The data can be read when the magnetic stripes 112-1 are swiped in a magstripe object reader 108 communicatively coupled to POS terminal 104. In some embodiments, other types of payment objects 112 can be used, for example smart cards having a built in integrated circuit including a memory chip 112-2 (e.g. EMV payment objects), a radio frequency identification tag (e.g. near field communication enabled objects), and the like. For this, the EMV object reader obtains data off the EMV chip 112-2 on the payment object 112. In some examples, the payment object 112 includes EMV chip 112-2 and also magstripes 112-1 to allow backward compatibility with legacy readers. Separate readers for different methods of payment facilitate object reading capabilities to be distributed between the magnetic object reader 108 and the EMV object reader 110 depending on whether the magnetic stripes are being read or the EMV chip.

The payment communication system 100 in the example of FIG. 1 illustrates the POS terminal 104 associated with the merchant 102A that participates in the payment service provided by the service provider of PPS 114. The PPS 114, in one implementation, may include the control logic registers, such as a device status register 128, a transaction count register 124 and a threshold count register 126 to store data which can be used to process and authorize payment transactions received at the POS terminal 104, described in subsequent paragraphs. In some implementations, the count registers 124, 126, and 128 can be stored in the POS terminal 104 or the EMV object reader 110. For example, storage and determination of the count locally is useful because the network connection with the PPS 114 is established only after the count is exceeded.

The POS terminal 104 can be a computing device (e.g., a mobile computing device) able to communicate with the PPS 114, and with various other computing devices, through suitable communication protocols, interfaces, and networks, including network 120, for example to generate and forward information into the registers 124, 126 and 128. In one example, the POS terminal 104 is a communication device such as a mobile phone, laptop, tablet computer, and the like, associated with a merchant providing an item or service for purchase. In another example, the POS terminal 104 is a mobile device that is wearable or otherwise connected to or associated with the buyer, for example, the computing device may be an Apple® watch or a Fitbit®. Further, the POS terminal 104 can be any appropriate device operable to send and receive requests, messages, or other types of information over the network 120. Additionally, while only a single POS terminal 104 is illustrated in the example of FIG. 1, in some embodiments there can be additional terminals depending on the number of merchants participating in the payment service, or a plurality of components arranged as a POS system.

The POS terminal 104 can be an electronic cash register that is connected to a payment object reader 110 capable of accepting a variety of payment objects 112, such as credit cards, debit card, gift cards, near-field communication (NFC) based payment instruments, and the like. As mentioned, the POS terminal 104 can be connected to a central processing server, the PPS 114 to obtain inventory of available products and services. The POS terminal 104 can work in both online and offline modes to allow the merchant 102A to both access the inventory and provisionally process payments whether or not the communication network between the PPS 114 is established or not. While some implementations describe the decision making to occur at the server or PPS level, it will be understood that in certain implementations, for example offline implementations, the POS terminal 104 can proxy for the PPS 114.

The POS terminal 104 can include an instance of a merchant application 106 executing on POS terminal 104. Merchant application 106 provides POS functionality to enable the merchant 102A to accept payments at a POS location using POS terminal 104. In some types of businesses, the POS location can correspond to a store or other place of business of the merchant, and thus, can be a fixed location that typically does not change on a day-to-day basis. In other types of businesses, however, the POS location can change from time to time, such as in the case that merchant 102A operates a food truck, is a street vendor, a cab driver, or has an otherwise mobile business, e.g., in the case of merchants who sell items at buyers' homes, buyers' places of business, etc. The merchant application 106 on POS terminal 104 can send transaction information to PPS 114, e.g., as the transaction is being conducted at the POS location. In some embodiments, such as if a particular POS terminal 104 is not connected to the network 114 and is therefore processing transactions offline, the transaction information can be sent in a batch at a subsequent point in time or using other suitable techniques. In some embodiments, the transaction information can be sent via SMS, MMS, or a voice call.

The POS terminal 104 includes specific communication ports to connect with a variety of devices, such as the magstripe object reader 108 and the EMV object reader 110 and even other remote devices, such as the PPS 114. The POS terminal 104 is communicatively coupled to the magstripe object reader 108 and the EMV object reader 110, either by direct connection, for example through an audio jack of the mobile phone connected to an audio plug of the magstripe object reader, a line input port, and a USB port, or through wireless connection, such as Wi-Fi, Bluetooth, BLE (Bluetooth low energy), NFC, or other appropriate short-range communication. Short-range communication as used herein refers to communication protocols having a generally short range of communication (less than 100 meters in some embodiments), such as NFC communication, RFID (radio frequency identification) tags, or Wi-Fi, etc.

While the magstripe object reader 108 can read data from a payment object, such as magnetic stripe object, the EMV object reader 110 reads data from the chip-type object, the read data in both cases is communicated to POS terminal 104. In one implementation, the magstripe object reader 108 includes a magnetic read head to read a magnetic stripe of the payment object as it is swiped through a groove of the magnetic stripe card reader whereas the EMV object reader 110 includes electrical contacts in a slot to connect with contacts of a chip of the payment object when it is inserted into the slot. The EMV object reader 110 can also read data from an NFC device and communicate the data to POS terminal 104. In one implementation, the EMV object reader 110 detects insertion of an EMV chip or such object in the slot of the EMV object reader 110 by establishing contact between the chip and the contacts in the slot. Subsequently, the EMV object reader 110 powers the chip. In some implementations, insertion of the chip causes the EMV object reader 110 to be activated.

The data read off the payment objects 112 is payment transaction data includes information required for processing payment transactions, including, but not limited to, service code, point-of-sale entry code, debit account information, credit cardholders name, credit card number, expiration date and card verification value (CVV), digital permanent account number (PAN) and so on. Note that in one embodiment, the POS terminal 104 is also equipped to register the connection status of the readers 110 and 108, but does not recognize a swipe from a dip action of the payment object or even differentiate a chip from a magstripe object.

In other words, while the POS terminal 104 recognizes the presence of both a magstripe object reader and the EMV reader, without the solution disclosed herein, the terminal 104 has no way to force the customer or merchant to stop a magstripe payment through a chip and magstripe card if an EMV card reader is present and functioning.

The readers 110 and 108 are both capable of encrypting the payment transaction data read off the payment object, such that a decryption algorithm is required to read the data embedded within. This also makes the process of stopping magstripe payments in the presence of the EMV object reader difficult.

However, as disclosed herein and in subsequent paragraphs, the PPS 114 obtains all such information from the readers 108 and 110 through the POS terminal 104 to allow magstripe payments in cases of technical fallback and "true" magstripe payment transactions, and reject magstripe payments in case an EMV object reader is available and functioning, where the EMV object reader 110 is said to be functioning if on dipping the payment object, the EMV chip can be successfully detected and read. The PPS 114 can decrypt the obtained payment transaction data to process transactions, authorize transactions, institute technical fallback flows, and so on. For example, the POS terminal 104 sends both the connection status, indicating which readers are connected to it at a point in time, and encrypted data, which indicates whether the object was swiped or dipped. The reader 110 or the POS terminal 104 can track and store the number of failed "dips," which is the number of times the payment object is detected to be dipped in the payment object reader 110 without yielding data. This count too is sent to the PPS 114 along with other encrypted data. By analyzing the aforementioned data parameters, the PPS 114 can make determinations whether to allow magstripe payments or to force EMV payments.

So, when the payment object is swiped or dipped into a reader, the POS terminal 104 sends a message MS1 to the PPS 114. The message MS1 includes information related to the readers 108 or 110 or both connected to the POS terminal 104 and data read from the payment object 112, which is encrypted and therefore secured from the POS terminal 104 or the merchant application 106 executing thereon. The PPS 114 analyzes the message MS1 by decrypting the data read from the payment object 112, specifically a service code or a POS entry code, to determine whether the payment object was a chip or a magstripe, whether it was swiped or dipped into a reader, and the number of times the card was unsuccessfully dipped in the card reader. The decryption can yield, substantially, any of the following scenarios:

In scenario A (illustrated by FIG. 2A), message MS1 includes information of a service code and a POS entry code that indicates the type of object and that the object was swiped into a payment object reader 108 connected to the POS terminal 104. The connection status from the POS terminal 104 indicates that only a magnetic stripe reader 108 was present at the time of payment transaction. The service code indicates that the payment object includes magstripe only. As such, only the magstripe object reader is sufficient to process payment transactions. The PPS 114 can process the transaction as a "true" magstripe transaction if the reader 108 is able to read data off of the magstripe 212-1 of the object 212.

In scenario B (illustrated by FIG. 2B), message MS1 includes information of the service code and the POS entry code that indicates the type of object and that the object was dipped into the EMV object reader 110 connected to the POS terminal 104. On insertion of an object, the EMV object reader 110 either powers the chip of the object or gets powered thus updating the connection status. The connection status from the POS terminal 104 indicates that EMV object reader 110 was present at the time of payment transaction. The service code indicates that the payment object includes EMV chip only. As such, only the EMV reader is sufficient to process payment transactions whether or not the magstripe object reader is present. The PPS 114 can process the transaction as a "true" EMV transaction.

In scenario C (illustrated by FIG. 2C), the connection status from the POS terminal 104 indicates that both EMV object reader 110 and magstripe object reader 108 are present at the time of payment transaction. Further assume that the customer 102B has an object that includes both a chip and magstripe on the object. The customer first attempts to swipe the payment object. The POS terminal 104 or the PPS 114, through the connection status, rejects the transaction as the customer 102B needs to dip the card in the EMV object reader 110. Thus, the swipe action generates a message MS1 which includes information of the service code and the POS entry code that indicates the type of object and that the object was swiped in the magstripe object reader in the presence of an EMV object reader. The PPS 114 analyzes message MS1 and rejects the payment transaction. Subsequently, PPS 114 may update a transaction count, which may be stored and associated with a register within the PPS 114. In some implementations, the transaction count may be stored locally within the PPS 114. It also sends a message or alert MS2 back to the POS terminal 104 requesting the customer 102B to attempt an EMV payment instead. In other words, the PPS 114 generates an alert causing the customer to engage the chip 112-1 of the payment object 112 with the EMV object reader 110. In one implementation, the alert MS2 has embedded within it an instruction set for the customer to establish contacts between the EMV chip 112-1 of the payment object and the EMV object reader 110 connected to the POS terminal 104. In other implementations, engagement with the alert or a link therein causes an automatic execution of the instruction set. In some cases, if the customer 102B repeatedly attempts to swipe instead of dip the payment object even once, the transaction may still be sent to PPS 114 for processing. The PPS 114 can flag such transactions as such so that the issuer can switch liability from the issuer to the merchant as EMV was not used or the EMV object reader 110 was not available to take EMV payments.

In scenario D (illustrated by FIG. 2D), the connection status from the POS terminal 104 indicates that both EMV object reader 110 and magstripe object reader 108 are present at the time of payment transaction. Further assume that the customer 102B has an object that includes both a chip and magstripe on the object. To this end, the customer 102B dips the payment object 112 having chip 112-2 in the EMV object reader 110. The EMV object reader 110 powers itself up and/or the chip due to insertion of an object. The payment object reader 110 updates an internal transaction count value stored in the POS terminal 104 or within the reader itself. If the chip 112-2 is faulty, the EMV object reader 110 cannot read any data and the result of a chip read yields a null value. The POS terminal 104 or the reader 110 stores the transaction count, a threshold count, and compares the transaction count with the threshold count. If the transaction count is less than the threshold count, the customer 102B is asked to re-attempt dipping of the EMV chip until the threshold count is met.

However, after repeated attempts of dipping and no data extraction, the technical fallback can be instituted. So, after a threshold number of failed attempts to read data off of the chip being dipped in the EMV object reader, the POS terminal 104 can detect whether a magstripe object reader 108 is connected. If not, the POS terminal 104 can instruct the merchant 102A to connect one. However, if it is connected, the POS terminal 104 generates instructions for the merchant 102A to accept payment through a swipe of the payment object 112. The message MS1 includes information of a service code and a POS entry code that indicates that the object was dipped into a reader a threshold number of times only to fail and then swiped into a magstripe object reader. The connection status from the POS terminal 104 indicates that both EMV object reader 110 and magstripe object reader 108 were present at the time of payment transaction. PPS 114 analyzes message MS1 and further analyzes a transaction count value. As mentioned before, the transaction count value stores any previous attempts made by the customer or the merchant to use EMV chip prior to swiping the magnetic part of the payment object 112. The fact that the customer or merchant had to make multiple attempts with the EMV chip indicate either a faulty chip or a faulty reader, both cases warranting institution of technical fallback.

In some implementations, the counter is managed at the server level. So, after detecting a dip, the message MS1 includes information of a service code and a POS entry code that indicates that the object was dipped into a reader, the connation status indicator, and the transaction count value. If the transaction count value is less than a predetermined threshold value ($C_{TH}$) PPS 114 rejects the payment transaction and sends a message or alert MS2 back to the POS terminal 104 requesting the customer 102B to attempt an EMV payment instead. In other words, the PPS 114 generates an alert causing the customer to engage the chip 112-1 of the payment object 112 with the EMV object reader 110. In one implementation, the alert MS2 has embedded within it an instruction set for the customer to establish contacts between the EMV chip 112-1 of the payment object and the EMV object reader 110 connected to the POS terminal 104. In other implementations, engagement with the alert or a link therein causes an automatic execution of the instruction set.

However, if the transaction count is more than the predetermined threshold value $C_{TH}$, PPS 114 tags the payment transaction as a magstripe transaction in technical fallback and forwards the payment transaction to the issuer, which then either processes or rejects the payment transaction based on various factors, such as risk rating of the customer, merchant, the payment object, and so on.

In other variations of scenario D where the message MS1 includes information of the POS entry code that indicates that the object was swiped into a reader, and the connection status from the POS terminal 104 indicates that both EMV object reader 110 and magstripe object reader 108 were present at the time of payment transaction, the receipt of message MS1 may automatically trigger querying of the value of transaction count. FIG. 2 delves into the various scenarios in further detail.

With reference to scenarios C and D, it should be noted that since the customer 102B has an EMV-chip enabled object, the customer 102B should first attempt to pay for the transaction using the EMV-chip 112-2, as per EMV specifications. Accordingly, the merchant 102A should have EMV object readers 112 to support acceptance of EMV payment object. For this, the POS terminal 104 or the PPS 114 first checks the kind of readers that are connected to the POS terminal 104. The PPS 114 and the POS terminal 104 know which readers are connected based on a stored connection status identifier, which is enabled when any communication is established between a reader and the POS terminal 104. However, note that the POS terminal 104 may not know whether an object was swiped or dipped especially in cases where the readers encrypt the data on read with the decryption algorithm residing in the PPS 114.

The POS terminal 104 can assign a value of the connection status indicator according to the communication protocol that is used to connect to a reader and/or the kind of reader that is being connected to. For example, if the POS terminal 104 establishes a communication channel with an EMV object reader 112 only, the connection status identifier may be set to 1, whereas the status can be set to 2 if only the magstripe object reader 110 is connected, and 3 if both the EMV and the magstripe object readers are connected. Such values can be saved in the PPS 114 as well, for example, in the device status register 128. Assuming that both EMV object reader 108 and the magstripe object reader 110 are connected to the POS terminal 104, the POS terminal 104 generates a message through its merchant application 106 to instruct the customer or merchant to dip the EMV-chip side of the object 112 in a slot of the EMV object reader 112.

Now assume that the chip-object is faulty. This may happen if the chip 112-1 on the object 112 has been accidentally damaged, has dirt on the contacts of the chip 112-1, is not compatible with the reader due to interoperability issues, or the EMV object reader 110 is not working properly. Understandably, the POS terminal 104 cannot read all or part of the payment transaction data off the faulty EMV-chip 112-1 and generates a reading error but can still register that a dip attempt was made. In some cases, the POS terminal 104 receives encrypted data from the readers 110 or 108 and sends the encrypted transaction data (but unbeknownst to the POS terminal 104 as incomplete or defective) to the PPS 114, which then returns the reading error to indicate that the data is unreadable on decryption and that the chip read is useless. If chip cannot be read correctly in either of the above cases, the merchant application 106 indicates in a message that the customer should re-try dipping the chip 112-1 in the EMC object reader 110, each time incrementing a count value to indicate the number of times the read operation of the EMV chip 112-1 fails "dip-read-failure". Again, the counter maintaining the dip-read-failures can either be local to the POS terminal 104 and reader 110 or remote, for example, in the PPS 114.

After a certain number of attempts trying to read the chip 112-1, the number being set by the institutions processing or issuing the payment object 112, the PPS 114 allows for technical fallback to be instituted. Most EMV cards contain a magnetic stripe, for either backwards compatibility in non-EMV environments or to support technical fallback if the EMV enabled chip is unreadable. Technical fallback describes an exception process wherein the magnetic stripe rather than the chip data on an EMV card is read by an EMV-capable device. In such situations the security mechanisms provided by EMV are effectively bypassed, and the transaction security reverts to that of a magnetic stripe. In many mature EMV markets, however, technical fallback is usually restricted and controlled, limiting this type of fraud.

The number of acceptable dip-read-failure attempts can be two or three before magstripe payments are permitted in lieu of EMV based payments. In one embodiment, the total count of EMV payment attempts can be maintained locally, i.e., as the client level, or remotely, i.e., at the server-level. For example, in one embodiment, the POS terminal 104 can maintain the number of times the EMV chip is dipped in the EMV object reader 110 to cause EMV payment which then resulted in a read-failure. The POS terminal 104 can then store the value within a local counter, e.g., within a secure enclave in the POS terminal 104 or in a database associated with the POS terminal 104. In another embodiment and as contemplated here, the PPS 114 maintains the value of the number of times the EMV chip 112-1 establishes contact with the EMV reader 110. The PPS 114 includes a transaction count register 124 to maintain the value in a parameter called transaction count, which increments every time a read-failure of the EMV chip is detected. Further, a threshold register count detects whether the transaction count exceeds a predetermined threshold count. If yes, the threshold register may comprise additional registers to specify conditions for which the magstripe object reader 108 is to be triggered for technical fallback or conditions where the EMV object reader 110 shall give an interrupt to another device, e.g. magstripe object reader 108 when it monitors that a maximum threshold count is exceeded.

As mentioned before, the POS terminal 104 and the PPS 114 are aware that another card reader is connected to the POS terminal 104. The other reader may be a magstripe object reader 108. The POS terminal 104 can detect that by checking the connection status indicator value. In another embodiment, if another reader is not connected and the EMV chip read has been failing, the PPS 114 can indicate to the merchant, for example through a text, email or GUI notification on the merchant application 106, to connect a magstripe object reader 108 to allow an alternate form of payment.

On establishing connection with a magstripe object reader 108, the PPS 114—having determined that the transaction count have exceeded the threshold count—can generate a notification to allow the customer to swipe the magnetic stripes 112-1 of the payment object 112. In this case, the magstripe object reader 108 reads the transaction data off of the magstripes 112-1, encrypts the data and sends it to the POS terminal 104, which sends it to the PPS 114. The PPS 114 decrypts the data and makes the determination whether to allow the transaction to proceed to the issuer or not.

On receiving authorization or contemporaneous to the authorization step, the POS terminal 104 or the payment processing system 114 on behalf of the merchant, generates a fund transfer request for the amount of product or service requested by the merchant 102A and sends to a computer system 114 of a payment processing service (referred to as "payment processing system" or "PPS 114") via a communications network 120. The PPS 114 can be a cloud computing environment, a virtualized computing environment, a computer cluster, or any combination thereof. The PPS 114 can analyze the fund transfer request based on a plurality of rules stored in a knowledge database (not shown) before sending the fund transfer request to a computer system 116 of the PPS' acquirer or merchant's acquirer (hereinafter "acquirer 116"). For example, one of the rules in the knowledge base may be determining whether the request is in a certain format or whether the request when run against a risk machine yields a safe score, or that the request was authorized based on technical fallback. In one implementation, the acquirer 120 is a bank or financial institution that processes payments (e.g., credit or debit card payments) and may assume risk on behalf of a merchant 102B or a plurality of merchants 103 aggregated by and represented under PPS 114. The acquirer 116 sends the fund transfer request to the computer system 118 of a card payment network (e.g., Visa, MasterCard, Discover or American Express) (hereinafter "card payment network 118") to determine whether the transaction is authorized or deficient in any other way. In some implementations, PPS 114 may serve as an acquirer and connect directly with the card payment network 118. The card payment network 118 forwards the data to the computer system of an issuing bank 117. The issuer 117 is a bank or financial institution that offered a financial account (e.g., credit or debit card account) to the buyer 102B or 102A. The issuer 117 makes a determination as to whether the buyer's payment information is valid and whether the buyer 102B has the capacity to absorb the relevant charge associated with the payment transaction.

Each of the aforementioned computer systems can include one or more distinct physical computers and/or other processing devices which, in the case of multiple devices, can be connected to each other through one or more wired and/or wireless networks. All of the aforementioned devices are coupled to each other through the communications network 122 and 120, including the Internet, intranet, a cellular network, a local area network, a wide area network, or any other such network, or combination thereof. Protocols and components for communicating over such a network are well known and are not discussed herein. Furthermore, PPS 114, the POS terminal 104, and the readers 108 and 110 can also communicate over the communications network 120 using wired or wireless connections, and combinations thereof. If the payment transaction is approved by the issuer 124 and/or the card payment network 122, a payment authorization message is communicated from the issuer to the merchant computing device 104 via a path opposite of that described above.

While the description above may be described with reference to a single device being mapped to a single object, it will be understood that various variations are within the realm of this methodology. For example, multiple devices can be registered with a single payment object or multiple payment objects in a manner described in the foregoing paragraphs. In such implementations, the authorization of a payment transaction in response to an introduction of a payment object in a technical fallback scenario may be based on the detection of a specific device or a collection of devices associated with a customer. Alternatively, the authorization may be based on the detection of a specific cluster of devices, in a specific order or location. In another scenario, the authorization may be based on detection of a specific object with a specific device amongst the cluster of devices, where the absence of another device indicates a more formal means of authorization. So, a buyer may be asked to key in a PIN or password shown on the first or a third device, either through a text or email notification, to authorize the payment transaction. Further, in some implementations, the technical fallback may also be implemented in certain geographical areas, for specific merchants, or at certain times.

FIGS. 2A-2D are illustrations of the different ways in which communication is established between the POS terminal 204 and readers 208 and 210, and subsequent treatment of a payment transaction based on the status of communication, according to an embodiment of the present subject matter. In one implementation, the POS terminal 204 is similar to POS terminal 104, also readers 208 and 210 are similar to readers 108 and 110 in both operation and construction. As a reminder, magstripe object reader 208 allows magstripe payments, while EMV object reader 210 is specifically for EMV and NFC based card payments. In the recent past, financial services providers all over the world have been replacing magnetic stripe objects with EMV objects to prevent cyber attacks at terminals to stem the growing tide of cyber attacks which had been greatly hurting banks. While the financial industry is switching from EMV to magstripe, businesses and card issuers want to provide both backward compatibility to customers and merchants who are yet to switch and also support an alternate mode of payment in cases EMV chip falls through during the initial years of set-up.

It should be understood that EMV and Payment Card Industry (PCI) standard specifications stipulate use of EMV chip whenever the merchant 202B has an appropriate reader, such as EMV object reader 210 connected to the POS terminal 204. The EMV technology is much more secured than typical magnetic stripes as the chip encrypts financial payment data multiple times before communicating with a POS terminal 104. With the liability shift, if a customer presents an EMV object at a point-of-sale and there is no EMV object reader, the business may still use the object's magnetic stripe to complete a transaction but are held liable for any fraud stemming from that transaction. However, if an EMV object reader is present but cannot be used in cases of faulty chip 212-2 or due to failure in reading the EMV chip 212-2, the merchant 202B can read the magstripe 212-1 to avoid the risk of the merchant losing the sale. This option for the merchant to 'fall back' to accepting the magstripe to complete the transaction is referred to as technical fallback. In such instances, the bank is still liable for the fraud as it would be for true EMV payment transactions.

The infrastructure to support technical fallback with the payment processing systems layout shown in FIG. 1 is explained hereinafter with reference to an example scenarios below. In the example scenarios, the customer 202B approaches the POS terminal 204 being manned by a merchant 202A, to pay for a product or service in a dedicated checkout area within a merchant store by presenting a payment object 212. The payment object 212, in this example, is a single object that includes both magnetic stripes ("magstripe") 212-1 and an EMV chip 212-2. This is however not required. The customer 202A can present two objects, one with magnetic stripes 212-1 and another with the EMV chip 212-2.

Consider scenario A (illustrated by FIG. 2A) in which the POS terminal 204 is connected to the magstripe object reader 208 only (and the EMV object reader 210 is disconnected as shown by dotted connection lines) and the customer 202B has the payment object 212 (that is one having both EMV ship and magstripe) which the merchant 202A swipes into the reader 208. The POS terminal 204, through a merchant application for example, sends a message called MS1 to the PPS 214 based at least on the data acquired from the object swiped. MS1 includes information of a point-of-sale entry code that indicates that the object was swiped into a reader, a service code (SC) that shows it was both a chip and magstripe object, the connection status (CS) from the POS terminal 204 indicates that only a magnetic stripe reader 108 was present at the time of payment transaction. The PPS 214 can process the transaction as a "true" magstripe transaction and indicate as such in MS2 to the POS terminal 204.

Consider scenario B (illustrated by FIG. 2B) in which the POS terminal 204 is connected to the magstripe object reader 208 and the EMV object reader 210 and the customer 202B has the payment object 212 (that is one having both EMV ship and magstripe) which the merchant 202B dips into a slot of the reader 210. The POS terminal 104, through a merchant application for example, sends a message MS1 to the PPS 114 based at least on the data acquired from the object inserted. In scenario B, message MS1 includes information of a POS entry code that indicates that the object was dipped into a reader, a service code (SC) that shows it was both a chip and magstripe object, and the connection status from the POS terminal 204 indicates that EMV object reader 210 was present at the time of payment transaction. The PPS 114 can process the transaction as a "true" EMV payment transaction and indicate as such in MS2 to the POS terminal 204.

Consider scenario C (illustrated by FIG. 2C) in which the POS terminal 204 is connected to the magstripe object reader 208 and the EMV object reader 210 and the customer 202B has the payment object 212 (that is one having both EMV ship and magstripe) which the merchant 202B swipes into the reader 208. The POS terminal 204 sends a message MS1 to the PPS 114 based at least on the data acquired from the object swiped. In scenario C, message MS1 includes information of the POS entry code that indicates that the object was swiped into a reader, a service code indicating the object has both chip and magstripes, and the connection status from the POS terminal 204 indicates that both EMV object reader 210 and magstripe object reader 208 were present at the time of payment transaction. PPS 214 analyzes message MS1 and rejects the payment transaction. It also sends a message or alert MS2 back to the POS terminal 204 requesting the customer 102B to attempt an EMV payment instead. In other words, the PPS 214 generates an alert causing the customer to engage the chip 212-1 of the payment object 112 with the EMV object reader 210. In one implementation, the alert MS2 has embedded within it an instruction set for the customer to establish contacts between the EMV chip 212-1 of the payment object and the EMV object reader 210 connected to the POS terminal 204. In other implementations, engagement with the alert or a link therein causes an automatic execution of the instruction set.

Thus the PPS 114 requests the customer to dip the object instead. On dipping, the chip may fail to be read. Subsequently, PPS 214 updates a transaction count (TC), which may be stored and associated with a register within the PPS 114, and optionally appended to the MS1 as MS1*. In some implementations, the transaction count may be stored locally within the PPS 214. After determining that a threshold number of dip-read-failures have been detected, the PPS 214 allows the customer to swipe thus instituting technical fallback.

In scenario D (illustrated by FIG. 2D), message MS1 includes information of the POS entry code that indicates that the object was swiped into a reader, the service code indicates that both chip and magstripe are included in the object, and the connection status from the POS terminal 204 indicates that both EMV object reader 210 and magstripe object reader 208 were present at the time of payment transaction. PPS 214 analyzes message MS1 and further analyzes a transaction count value. The transaction count value stores any previous attempts made by the customer or the merchant to use EMV chip prior to swiping the magnetic part of the payment object 212. The fact that the customer or merchant had to make multiple attempts with the EMV chip indicate either a faulty chip or a faulty reader, both cases warranting institution of technical fallback.

If the transaction count value is less than a predetermined threshold value ($C_{TH}$) PPS 214 rejects the payment transaction and sends a message or alert MS2 back to the POS terminal 204 requesting the customer 202B to attempt an EMV payment instead. In other words, the PPS 214 generates an alert causing the customer to engage the chip 212-1 of the payment object 212 with the EMV object reader 210. In one implementation, the alert MS2 has embedded within it an instruction set for the customer to establish contacts between the EMV chip 212-1 of the payment object and the EMV object reader 110 connected to the POS terminal 204. In other implementations, engagement with the alert or a link therein causes an automatic execution of the instruction set.

However, if the transaction count is more than the predetermined threshold value $C_{TH}$, PPS 214 indicates to the customer to attempt swiping the magstripe of the magstripe object. The PPS 214 then tags the payment transaction as a magstripe transaction in technical fallback (for example by appending MS1* with such information) and forwards the payment transaction to the issuer, which then either processes or rejects the payment transaction based on various factors, such as risk rating of the customer, merchant, the payment object, and so on.

In other variations of scenario D where the message MS1 includes information of the POS entry code that indicates that the object was swiped into a reader, and the connection status from the POS terminal 204 indicates that both EMV object reader 210 and magstripe object reader 208 were present at the time of payment transaction, the receipt of message MS1 may automatically trigger querying of the value of transaction count.

Figure 3:
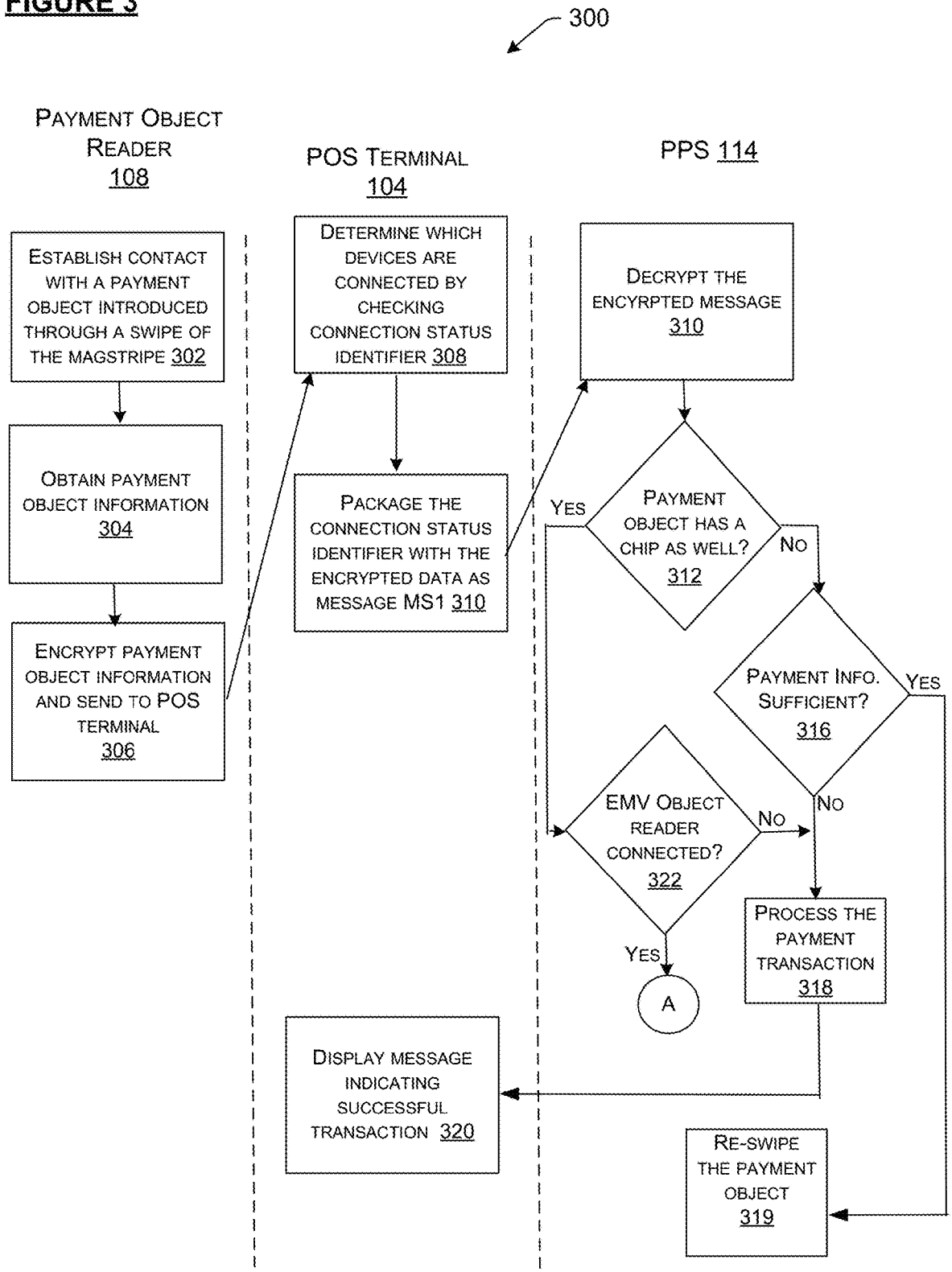
FIG. 3 is a sequence flowchart illustrating an example method of facilitating a magnetic stripe (magstripe) payment from a payment object equipped with both magnetic stripes and an EMV integrated-circuit chip, according to an embodiment of the present subject matter.

FIG. 3 is a flowchart illustrating an example method 300 of facilitating a magnetic stripe (magstripe) payment from a payment object equipped with both magnetic stripes and chip, according to an embodiment of the present subject matter. The process 300 can be performed by one or more components, devices, or modules such as, but not limited to, the mobile device, the payment processing system, merchant device or POS terminal, or payment beacon or other components or devices. For the sake of explanation, the description hereinafter is described with reference to components described in FIG. 1, however components other than the ones mentioned in FIG. 1 may be used. As illustrated in FIG. 3, the process 300 includes a set of operations from block 302 to block 330.

The process 300 starts with the operation at block 302. A buyer 102B with a payment object 112 approaches a checkout area at a merchant location, which is equipped with a payment object reader 108 and presents the method of payment, e.g., a payment object 112 like a credit card having both magstripes and chip. The buyer however only inserts the magstripes into the magstripe object reader 108, for example through a swipe action. The reader thus establishes contact with the magnetic stripes of the payment object 112. At this point, the customer may or may not have made previous attempts to dip the chip of the payment object in the EMV object reader. The transaction count that stores the number of times attempts were made to dip the card, which then resulted in dip-card-failures, may be stored in the POS terminal 104. (step 302).

The magstripe object reader 108 may store the location coordinates of the buyer or a device associated with the buyer by establishing connection with the buyer device. The payment object reader 108 also scans the payment object that was inserted or otherwise introduced in the magstripe object reader 108. For example, the magstripe object reader 108 obtains the payment object information, e.g., the last four of the card data, CVV1, CVV2, service code, point-of-sale entry code, and other such information. The payment object information also includes information indicating that the payment object includes an integrated circuit as an alternate mode of payment as well (step 304). The magstripe object reader 108 can include a card interface for reading a magnetic stripe and can include encryption technology for encrypting the information read from the payment object 112. The encryption technology includes a National Institute of Standard and Technology (NIST) compliant True Random Number Generator (TRNG) that can generate the pseudo-random numbers. The encoding can also be done based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key). The encrypted fingerprint can also be created using other schemes, such as fuzzy vault algorithm, a cancelable fuzzy vault scheme based on irreversible hash functions, such as hash functions, such as MD, RIPEMD, and SHA. The magstripe object reader 108 sends the encrypted data to the POS terminal 104 to which it is connected (step 306).

The POS terminal obtains the connection status indicator. The POS terminal saves connection status identifier as a value to indicate the devices connected to the POS terminal, include the magstripe object reader 108. This status is updated for example at the time the POS terminal establishes connection with the devices (step 308). In this case, only the magstripe object reader 108 and a printer are connected. The connection status identifier indicates as such.

The POS terminal 104 packages the received encrypted data along with connection status identifier and the transaction count into a message MS1 and sends the message to a payment processing system, which may be a server or cloud-based implementation (step 310).

At step 312, the payment processing system decrypts the message MS1 containing the information related to the swiped object and the connection status identifier, by using a decryption algorithm based on the same algorithm as the encryption technology.

At step 314, the PPS 114 determines whether the magstripe transaction can be allowed. For example, on analysis, PPS determines whether the payment object includes an integrated chip as well. Additionally, PPS 114 may determine whether an EMV object reader 110 is connected. If the determination is "No," that is if the payment object includes no chip and/or there is not EMV object reader, the transition proceeds to whether there is sufficient payment information to process the transaction (step 316). If not, the customer is requested to re-swipe the card or manually enter the card information as shown in 319, but if the transaction information is sufficient, the transaction information is sent to the card processing networks for further processing (as shown in step 318) and a message indicating successful transaction is displayed on the POS terminal 104 (step 320).

Step 322 follows the step of determining whether the object has a chip card. If yes, the PPS determines whether an EMV object reader is connected to the POS terminal 104, for example by checking the connection status identifier. If the EMV object reader is connected, the EMV certifications stipulate that EMV chip be inserted instead. Accordingly, that process is followed and the magstripe payment is rejected if a certain number of dip attempts have not been made already. This is discussed in FIG. 4.

Figure 4:
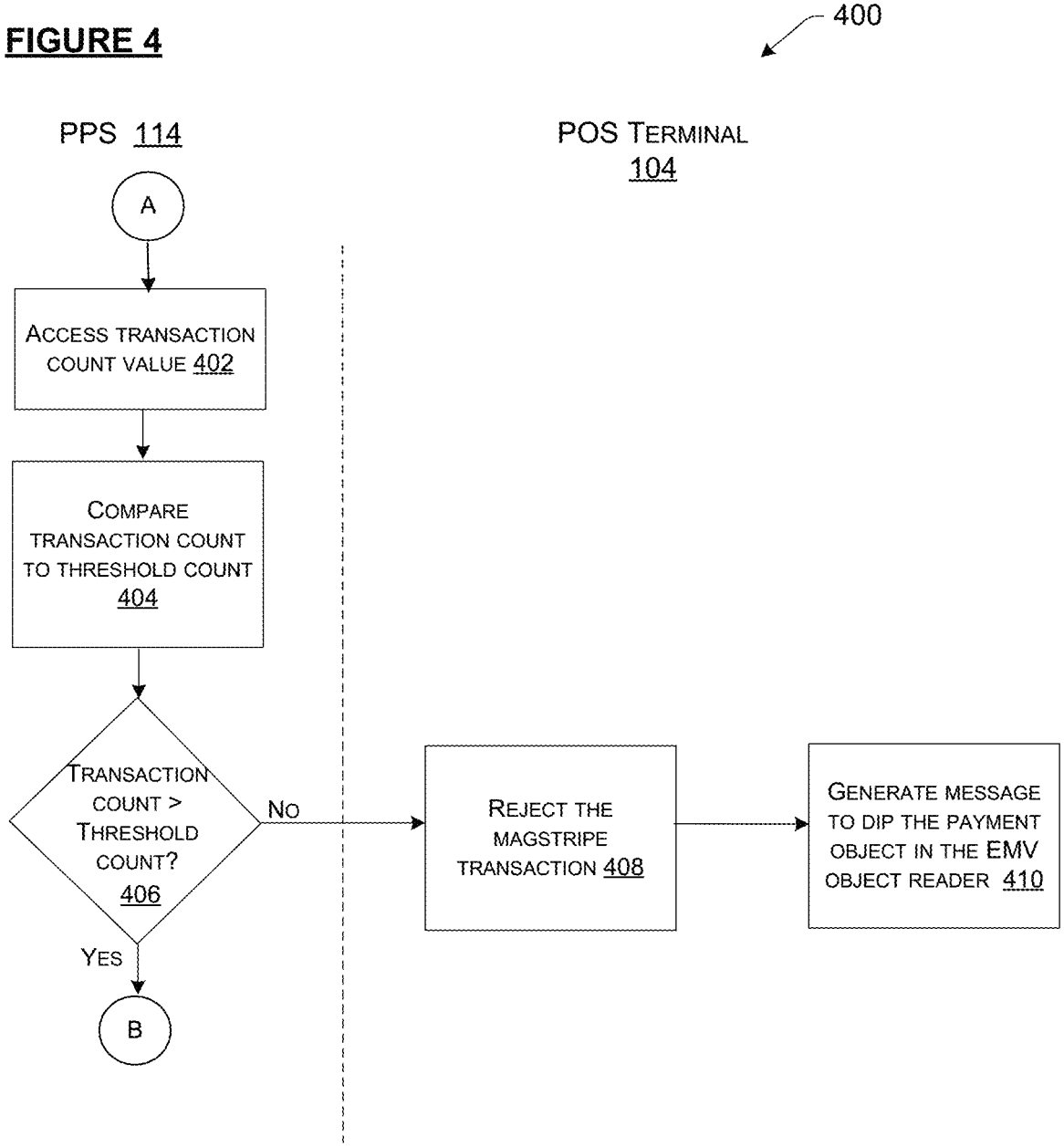
FIG. 4 is a sequence flowchart illustrating an example method of rejecting the magstripe payment from a payment object equipped with both magnetic stripes and EMV chip when the technical fallback scenario is not met, according to an embodiment of the present subject matter.

FIG. 4 is an example method 400 of rejecting a magnetic stripe (magstripe) payment from a payment object equipped with both magnetic stripes and chip when the technical fallback scenario is not met, according to an embodiment of the present subject matter. The process 400 can be performed by one or more components, devices, or registers such as, but not limited to, the mobile device, the payment processing system, merchant device or POS terminal, or payment beacon or other components or devices. For the sake of explanation, the description hereinafter is described with reference to components described in FIG. 1. As illustrated in FIG. 4, the process 400 includes a set of operations from block 402 to block 408.

The process 400 continues from step 322. In one implementation, the PPS 114 can determine whether another payment alternative is present, for example, by communicating with the POS terminal 104. In another implementation, the PPS 114 determines connection status of other devices by accessing the connection status identifier. On detecting an EMV object reader 110, the PPS 114 accesses a value referred to as transaction count, which indicates if an EMV chip has been dipped in response to the transaction in question. The transaction count may be stored in the POS terminal 104 as well (step 402). The transaction count is then compared to a threshold count value at step 404. In some implementations, the POS terminal 104 makes the comparisons and transmits the status of whether or not the threshold has been met to the PPS 114, instead of sending the transaction count. The transaction count value can be based on a number of factors and can be both static and/or dynamic. For example, in one instance, the location of the merchant store, for example in a neighborhood with high fraud events, can have a lower threshold value. On comparison, it is determined whether the transaction count is more than the threshold count in step 406. If the transaction count is less than a threshold value, the magstripe payment transaction is considered invalid (step 408) and the customer is asked to dip the object instead through a message notification on merchant application 106 (step 410) This process continues until read data is obtained off of the EMV chip. However, if the transaction count is more than the threshold count, the magstripe payment is processed differently as will be discussed in FIG. 5.

Figure 5:
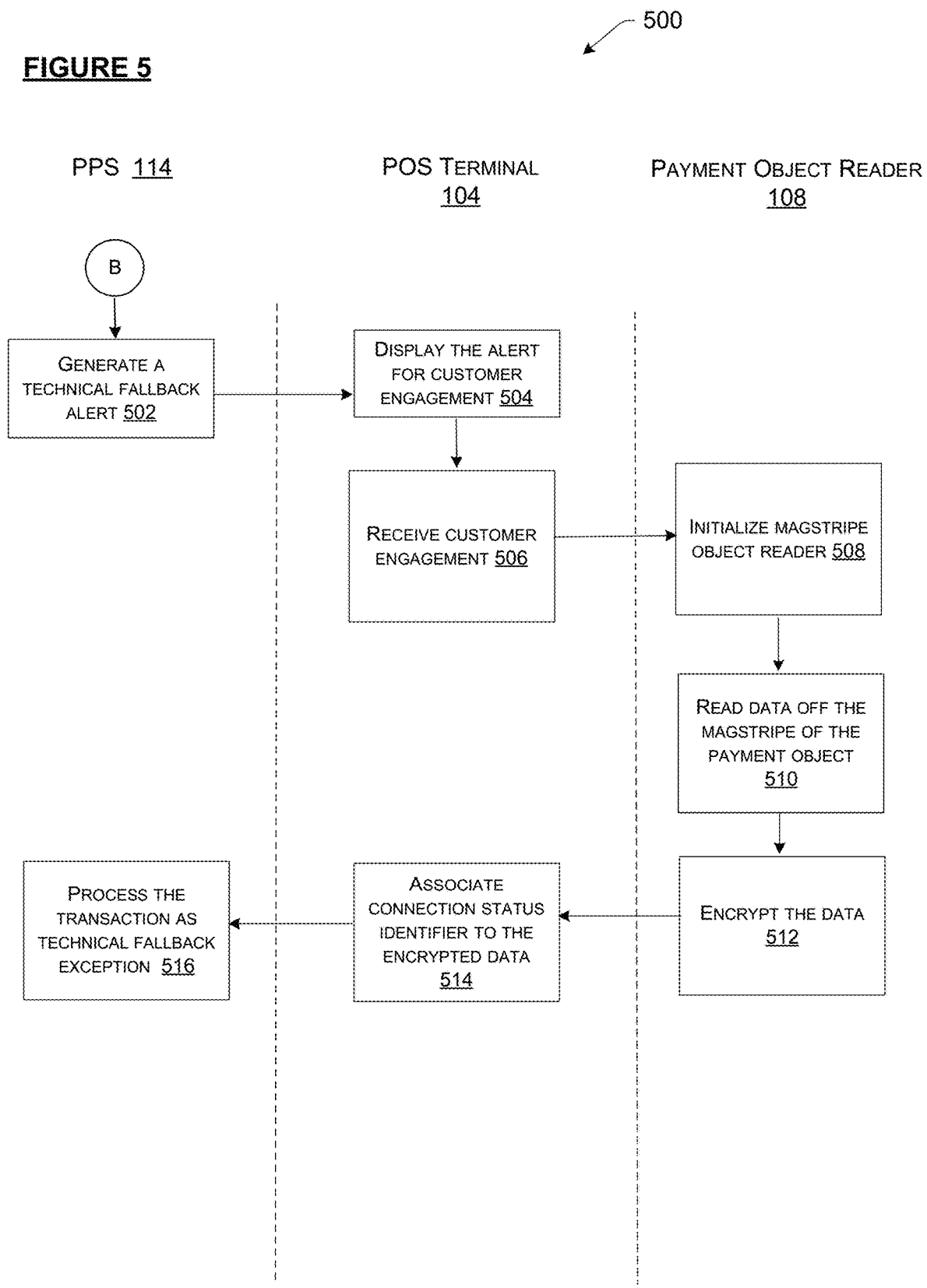
FIG. 5 is a sequence flowchart illustrating an example method of facilitating the magstripe payment from a payment object equipped with both magnetic stripes and chip when the technical fallback is instituted, according to an embodiment of the present subject matter.

FIG. 5 is an example method 500 of facilitating a magnetic stripe (magstripe) payment from a payment object equipped with both magnetic stripes and chip when the technical fallback is instituted, according to an embodiment of the present subject matter. The process 500 can be performed by one or more components, devices, or registers such as, but not limited to, the mobile device, the payment processing system, merchant device or POS terminal, or payment beacon or other components or devices. For the sake of explanation, the description hereinafter is described with reference to components described in FIG. 1. As illustrated in FIG. 5, the process 500 includes a set of operations from steps 502 and 516.

The process 500 starts with the operation at step 502 after it is determined that a threshold number of dip-read-failure attempts have been made to read the chip of the EMV payment object in an EMV object reader. If the transaction count is more the threshold count, the PPS generates a technical fallback alert. The alert can also includes an instruction set guiding the customer or the merchant to activate a magstripe object reader if it is not already connected and processing payments through the magstripe of the payment object. (step 502).

The PPS sends the technical fallback alert to the POS terminal 104 and displays on the merchant application 106, for example. The alert can include engagement links for the customer or merchant, which when activated enables the magstripe payment process (Step 504).

At step 506, the POS terminal 104 receives engagement from the user to provide magstripe payment instrument. The magstripe object reader 108 is initialized at step 508 and the magstripe of the payment object 112 is read through the magstripe object reader 108 at step 510. The data is encrypted and sent to the POS terminal 104 at step 512. The POS terminal 104 can add connection status identifier to the data after encryption to indicate the presence of EMV object reader 110 (step 514). Further, the PPS 114 appends the technical fallback information before sending to the issuer, which processes the transaction as it would in a technical fallback scenario (step 516).

Figure 6:
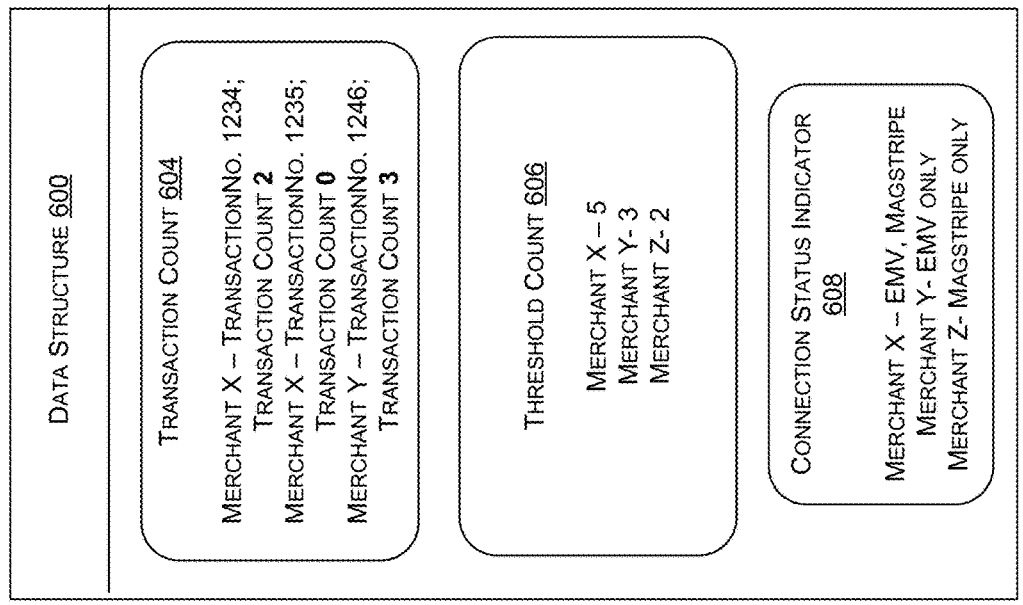
FIG. 6 illustrates an exemplary data structure to store data that facilitates institution of technical fallback in payment transactions, according to an embodiment of the present subject matter.

FIG. 6 is an exemplary representation of a data structure in which the data may be stored and retrieved for processing of payment transactions, according to an embodiment of the present subject matter. The data structure 600 includes, for instance, data tables 602, 604, 606, and 608 for payment transaction data, transaction count, threshold count and connection status identifier respectively. Further, there may be multiple data tables corresponding to each merchant or customer or both. The data structure 600 can be stored within the POS terminal 104 or the PPS 114.

In one implementation, the data table 602 includes data read off the payment object and includes fields such as service code and POS entry code. The data table 608 indicates connection status identifier showing the devices connected to a terminal at a specific merchant location. The threshold count is the counter value with which the number of failed EMV attempts is mapped. The threshold count may vary on a merchant, customer or transaction basis. The conditions or rules controlling the threshold count may be stored in PPS 114 in the same register called threshold count 606 and may vary the threshold count in real-time or set it to be static over a period of time. The transaction count controls the number of EMV payment attempts corresponding to a particular transaction. In some cases, these values may be mapped to a customer and payment object for analysis related to fallback transactions associated with a location or customer's payment object. It will be understood the data-structures shown in FIG. 6 are only for the purpose for illustration. The content, format and layout may vary from one device and one operating system to another. Further the content can vary based on various factors such as the method of decryption, and rules and conditions set by the PPS, merchant or customer or both.

Figure 7:
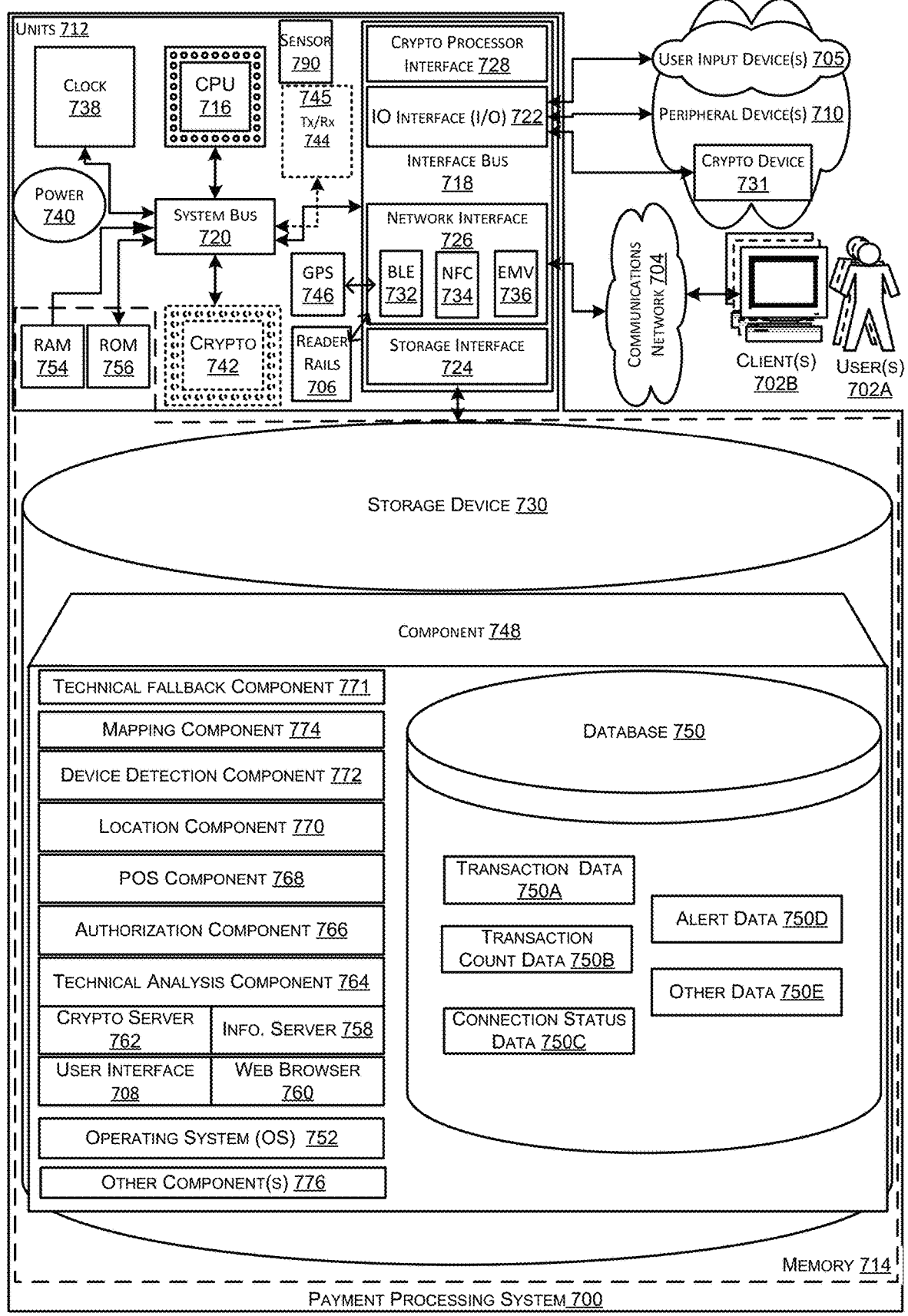
FIG. 7 is a block diagram illustrating components of a payment processing system, according to an embodiment of the present subject matter.

FIG. 7 is a block diagram illustrating embodiments of a PPS 700 configured to allow processing of payment transactions between entities, such as a merchant and a buyer, or a sender and recipient of funds by authorizing transactions initiated by registered devices. In one embodiment, the PPS 700 may serve to aggregate, process, store, search, serve, identify, instruct, generate, match, and/or facilitate interactions with a computer through various technologies, and/or other related data. The PPS 700 may be used to collect data for later retrieval, analysis, and manipulation, which may be facilitated through an internal or external database. For example, the PPS 700 on receiving payment related information may complete the transaction, generate receipt as proof of the transaction, update inventory of the product after the transaction, and obtain data related to the buyer involved in the transaction, such as transaction history, location data, and the like. In some implementations, the components of the PPS 700 can also be found in a buyer device (for example, a mobile phone of a buyer), a merchant device (for example, a point-of-sale terminal for processing payment transactions), and a payment beacon to send and receive static or dynamic information, for example, the payment proxy, transaction summary or receipt, either perpetually or on activation. The devices may have fewer or more components than defined here as will be clear by context.

The PPS 700 may communicate with a POS terminal (e.g., transaction processing software applications executing on a tablet, or a computer) and various neighboring and remote, but connected, devices, such as buyer devices. The PPS 700 has the circuitry and logic to register a new device presented at the time of transaction along with a payment object, and mapping the device with the object or without the object for any subsequent payment transactions. The device may be registered in a variety of ways based on the characteristics that are obtained. For example, if the radiated performance is to be used as a factor in device registration and identification, the antenna transmitter and receiver of the PPS 700 are initialized. In another example, if the manufacturing tolerances are to be measures, components like the sensors and accelerometers of the PPS 700 are activated.

Users 702A, who may be buyers, merchants, consumers, senders or recipients of funds, buyers, sellers, and/or other entities or systems, may engage information technology systems (e.g., computers, mobile devices, laptops, servers) to facilitate processing of information, such as transactional, financial, and so on. It should be noted that the term "server" as used throughout this application refers generally to a computer, other device, program, or combination thereof that processes and responds to the requests of remote users across a communications network. Servers serve their information to requesting "clients" 702B connected to the users 702A. The term "client" or "buyer device" as used herein refers generally to a computer, program, other device, user and/or combination thereof that is capable of processing and making requests and obtaining and processing any responses from servers across a communications network 704. Networks 704 facilitate the transfer of information from source points to destinations. The users (e.g., merchants) may directly interact with the PPS 700, e.g., via the user inputs devices 605.

In one implementation, the PPS 700 can be configured to receive a payment card or payment card information to process payment card transactions (i.e., those involving reading of a payment card physically provided by the buyer at the merchant's location), as well as card-not-present (CNP) transactions (i.e., those where the instrument is not physically presented at the time that the payment is effected, e.g., through payment proxy), either through a card reader 606 or by providing a graphical user interface 708 to accept financial account information of the user 702A initiating the payment. A payment card transaction may be any transaction where a merchant or a buyer uses a payment card to purchase a product or service offered by the merchant, for example, by swiping a user's credit card through a magnetic rails or chip contacts 706 or by providing the information through voice, text, or other wired or wireless data communication techniques. The term "swipe" here refers to any manner of triggering a magnetic rails or chip contacts 706 to read data from a payment card, such as by passing a card into or through a magnetic stripe card reader, optical scanner, smartcard (card with an embedded IC chip) reader (e.g., an EMV-compliant card reader or NFC enabled reader), radio frequency identification (RFID) reader, or the like. The magnetic rails or chip contacts are integrated within the PPS 700 (as shown) or connected externally with the PPS controller 700 and/or client(s) 702B as peripheral devices 710. If the card reader 706 is connected externally, the peripheral devices 710 may be connected via wired or wireless communication network 704 and interact to each other through customized interfaces. In one implementation, the PPS 700 can be connected to an audio plug of another device, such as the POS terminal. If the PPS 700 is integrated within the POS terminal, the one or more interfaces and components can be configured to accept payment data through various communication protocols. Accordingly, hardware implementation may include creation of slots, magnetic tracks, and rails with one or more sensors to facilitate a user 702A, e.g., a merchant, to detect and accept a payment card. In one implementation, the payment card and the peripheral devices 606 may support the same technology for short-range (typically less than 100 meters) and/or low power wireless communication protocols and technologies, such as Bluetooth Low Energy (BLE), standard Bluetooth, WiFi, Near Field Communication (NFC) or Radio-Frequency Identification (RFID). According to the communication protocol preferred or implemented, the PPS 700 may require additional steps to configure the rails or chip contacts 706 to operate and work alongside the PPS 700. For example, a pairing component (described later) may be used to connect, synchronize, and pair various devices to facilitate exchange of data obtained off the payment card.

The term "payment card" or 'payment object' refers to a payment mechanism that includes a conventional debit card, a conventional credit card, a prepaid gift card, or the like, a smartcard that has an embedded integrated circuit chip (e.g., Europay-MasterCard-visa (EMV) card), a proxy card, or any card that functions as a combination of any of these mechanisms. The term "proxy card" as used herein refers to a card that may or may not have a card number/account number that appears to be that of a real credit or debit card account (i.e., it is in the correct format), but where that card/account number is actually only a proxy for the buyer's real card/account number. The card/account number generally adheres to a naming standard set by the financial institution associated with or issuing the payment card. Other examples of payment card may also include a prepaid card, a gift card, a rewards card, a loyalty points card, a frequent flyer miles card, a check, cash, or any other kind of payment instrument that holds financial value or provides a promise to pay at a later time.

The payment card used in the example above is one type of a financial instrument. Other types of financial instruments, other than the payment card, can be used to initiate the transfer of funds. Another example of a financial instrument is a biometrically identifiable instrument, such as a person's finger (e.g., for fingerprint recognition), face, iris or retina, heartbeat, voice pattern, genetic parameter unique to the user, etc. Alternatively, a financial instrument can be a software instrument or virtual instrument, such as a virtual wallet, optionally embedded in a hardware device to enable contact or contactless payments.

Payment Object Reader Architecture

In one implementation, the PPS 700 may be based on computer systems that may comprise, but are not limited to, PPS units 712 and memory 714. Furthermore, PPS units can comprise hardware and/or software components, referred to as PPS units 712, which may comprise a central processing unit ("CPU(s)" and/or "processor(s) and/or microprocessor(s)" (these terms are used interchangeably)) 716 and an interface bus 718, which may be interconnected and/or communicating through a system bus 720 on one or more motherboard(s) having conductive and/or otherwise communicative pathways through which instructions (e.g., binary encoded signals) may travel to enable communications, operations, storage, etc. The interface bus 718 may also include other interfaces or adapters specific to network, storage, peripherals, and input-output interface(s), through which data may pass into and out of a computer and which allow users to access and operate various system components. The interface bus 718 may be connected to external units, such as peripheral devices 710 or client(s) 702B via communication network 704. Each of the exemplary components 712 is now described in detail.

Processor(s)

The CPU 716 may incorporate various specialized processing units, such as, but not limited to: integrated system (bus) controllers, memory management control units, floating point units, and even specialized processing sub-units like graphics processing units, digital signal processing units, and/or the like. In various embodiments, the processor core may be a low-power/ultra-low power/low-cost microcontroller; examples include an Intel Processor like Intel Atom, Apple A4, NVidia Tegra 2, Marvell Armada, Qualcomm Snapdragon, Samsung Hummingbird and Exynos, Texas Instruments OMAP and MSP microcontroller, ARM Holdings processor like the Cortex-A, -M -R, Series, or ARM series and/or the like processor(s). Should processing requirements dictate a greater amount speed and/or capacity, distributed processors (e.g., Distributed PPS 700), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the PPS 700 may be achieved by implementing a microcontroller, such as Freescale's Kinetis K21D; and/or the like. Also, to implement certain features of the PPS 700, some feature implementations may rely on embedded components, such as: Application-Specific Integrated Circuit ("ASIC"), Digital Signal Processing ("DSP"), Field Programmable Gate Array ("FPGA"), and/or the like embedded technology. Depending on the particular implementation, the embedded components may include software solutions, hardware solutions, and/or some combination of both hardware/software solutions.

Interface Bus and Adapters

Interface bus(ses) 718 may accept, connect, and/or communicate to a number of interface adapters, although not necessarily in the form of adapter cards, such as but not limited to: input-output interfaces (I/O) 722, storage interfaces 724, network interfaces 726, and/or the like. Optionally, cryptographic processor interfaces 728 may be connected to the interface bus 718.

Storage interfaces 724 may accept, communicate, and/or connect to a number of storage devices such as, but not limited to: storage devices 730, removable disc devices, and/or the like. Storage interfaces 724 may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), fiber channel, Small Computer Systems Interface (SCSI), Universal Serial Bus (USB), and/or the like.

Input-Output interfaces (I/O) 722 may accept, communicate, and/or connect to user input devices 705, peripheral devices 710, such as externally connected card readers, cryptographic processor devices 731, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); USB 2.0; USB 3.1; USB Type C; Ethernet; infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, Li-Fi etc.); and/or the like. In various embodiments, an audio or video display with a touch screen and driver may be included, the touch screen being based upon a variety of later-developed or current touch screen technology including resistive displays, capacitive displays, optical sensor displays, electromagnetic resonance, or the like. Additionally, touch screen display may include single touch or multiple-touch sensing capability. Any display technology may be used for the output display, such as a Liquid Crystal Display (LCD) or solid state device such as light-emitting diode (LED) or organic light-emitting diode (OLED), Plasma display, trans-reflective (Pixel Qi) display, electronic ink display (e.g. electrophoretic, electrowetting, interferometric modulating). In various embodiments, the resolution of such displays and the resolution of such touch sensors may be set based upon engineering or non-engineering factors (e.g. sales, marketing). In some embodiments, speakers and LED indicators can be used to present audio and visual identifiers of transaction and device status. In addition, buttons may be configured to power PPS 700 on or off, operate the controller or reset the controller 600.

In some embodiments of the PPS 700, image capture device may be included, which may further include a sensor, driver, lens and the like. The sensor may be based upon any later-developed or convention sensor technology, such as CMOS, CCD, or the like. Image recognition components may be provided to process the image data. For example, such components can support functionalities including, but not limited to, barcode detection, facial recognition, camera parameter control, etc.

Network interface(s) 726 may be regarded as a specialized form of an input-output interface. One or more network interfaces 726 may be used to engage with various communications network types 704. For example, multiple network interfaces may be employed to allow for the communication over broadcast, multicast, and/or unicast networks. Through a communications network 704, the PPS controller 700 is accessible through remote clients 702B (e.g., computers with web browsers) by users 702A. Network interfaces 726 may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed PPS architectures may similarly be employed to pool, load balance, and/or otherwise increase the communicative bandwidth required by the PPS 700.

In some implementations, the network interfaces 726 may be communicatively coupled to hardware components, which facilitate detection of payment cards. For example, the network interfaces 726 may couple to a payment card slot or rail designed to accept payment cards through swipe or insertion or any other action. In another example, the network interfaces 726 may couple to one or more sensors included to detect presence of payment card or a tap of the payment card onto a surface of the PPS 700.

In various embodiments, the network interface 726 may also support wireless data transfers between the PPS 700 and external sources, such as clients 602B and cameras, or the like. Wireless protocols may include Wi-Fi (e.g. IEEE 802.11a/b/g/n, WiMax), Bluetooth or Bluetooth low energy (BLE); infrared, and the like, through BLE interface, WiFi interface, QR interface, NFC interface, EMV interface, cellular technology interface, and other interface(s), described subsequently.

According to one implementation, BLE interface ("BLE") 732 is configured to work on Bluetooth® or BLE® protocol to facilitate communication with a BLE transceiver installed on other devices. In one implementation, BLE is intended for low-power and low-latency applications for wireless devices within a short range, such as up to about 50 meters. BLE interface 732 may be used in applications requiring intermittent communications, smaller amounts of data transfer and bandwidths, and/or low duty cycles. BLE interface 732 can be configured to use only a fraction of the power as compared to other interfaces. In many cases, BLE interface 732 may be able to operate more than a year on the power source without charging.

BLE interface 732 is capable of being paired with a peripheral device, such as another reader, a payment card, or a client 702B associated with a user 702A, thus allowing the PPS 700 to (a) serve as a "beacon" and broadcast data and/or (b) become a relay point between the PPS 700 and payment card, card reader 706 or a client 702B serving as a point of sale terminal for a merchant. The BLE interface 732 allows the controller 700 with BLE interface 732 can be placed at merchant locations, museums, ski resorts, state parks, entertainment venues, parking garages, etc.

As defined herein, a beacon is a short range communication device having a known or fixed location that provides a signal that can be detected by mobile devices within proximity of the beacon. For example, BLE interface 732 can transmit a radio frequency (RF) signal that includes its position coordinates (e.g., latitude, longitude), which can be detected by a mobile device. Alternatively, BLE interface 732 can transmit other data, such as payment proxy related to the financial account information of the user 702B.

The PPS 700 BLE beacon allows for constant, scheduled or random scanning of other Bluetooth peripherals and devices. In one implementation, a component, such as BLE interface component, within the PPS 700 and/or the client 702B can be set to run in the background under a BLE protocol, persistently, intermittently or on activation monitoring for a significant change in location and/or presence of an appropriate BLE peripheral or beacon at a merchant or vendor location. BLE beacon also allows for persistent or intermittent transmission of data. For example, BLE beacon may persistently transmit or receive information related to payment proxy associated with the client 702B or PPS 700.

When the owner or user of the client 702B or payment card enters a store having PPS 700 as a point of sale terminal, he or she would get in the BLE network radius of the PPS 700. PPS 700 then serves as a bidirectional conduit for the card reader 706 to communicate with the CPU 724 collecting or handling the credit card transaction. Along with receiving transaction data or any other data by the BLE interface 732, the PPS 700 may also encrypt, decrypt, or store the data for future processing. It does these actions in addition to running the payment application itself, which may display items for sale, up-sell based on purchases, allow confirmation of purchases, application of coupons, the ability to provide feedback, etc.

In one implementation, the PPS 700 or the client 702B may be connected to a BLE peripheral device having BLE interface 732 functionalities. In some implementations, the payment card may include a chip supporting BLE functionalities. A control logic unit (not shown) may also be included to bridge BLE interface either to ISO 7816 contact interface or ISO 14443 contactless interface to provide for autonomous bi-directional data transfer between paired devices. In one implementation, the PPS 700 is capable of communicating using Bluetooth, and is thus able to pair with a peripheral device 710 to obtain payment object information from a phone that at least has Bluetooth capabilities. In one implementation, a plurality of BLE peripheral devices may be connected via the BLE protocol, or other communication network, to form a mesh network. Such a mesh network may allow for transfer of data between the peripheral devices, even those that are more than the distance prescribed by the BLE protocol.

Similar to BLE beacons, data can be exchanged using other kind of RF beacons, infrared beacons, cellular communications (CDMA, GSM, LTE, etc.), beacons, pattern generation beacons, such as barcodes, Quick Response (QR) codes, or a radio frequency identifier (RFID) tag. QR code or NFC may have short range but high accuracy; Wi-Fi or Bluetooth may have mid-range and medium accuracy; and cellular may have long-range but low accuracy. In some embodiments, the controller 700 can receive and permanently store payment information so that the controller 600 acts as a payment object that does not require a payment card or other payment object to be present.

In one example, an NFC interface 734 ("NFC") can allow for close range communication using standards such as ISO 18092, ISO 21481, TransferJet® protocol and in compliance with FIME certifications. Close range communication with the NFC interface may take place via magnetic field induction, allowing an NFC interface chip 634 to communicate with other NFC devices or to retrieve information from tags having RFID circuitry via the NFC interface. In instances where it is desired to read an NFC enabled payment object, or an NFC enabled payment object is determined to be in proximity to the CPU 716 may be configured to drive antenna 745 via a driving circuit (not shown) to induce a magnetic field capable of being modulated by the NFC enabled payment object. From here, the modulated magnetic field signal may be converted into a digital signal that CPU 716 can interpret via the NFC component 734. On the other hand, when it is desired to transmit data via antenna 745, CPU 716 may be configured to disable the driving circuit and transmit data using the NFC protocol by instructing a NFC modulator (not shown) to modulate the magnetic field to which antenna 745 is operatively coupled. In some embodiments, there can be a switch within the NFC modulator to turn on or off the load applied to the antenna 745. The switch can be under the control of the CPU 716. In some embodiments the antenna 745 can drift from a desired frequency (become detuned). This can be the result of a metal object being in the proximity of device 610 or reader 700. The monitor circuit (not shown) can monitor the frequency of the antenna 745, and determine when the frequency of the antenna 745 has drifted away from the desired frequency. When the it is determined that the NFC antenna 745 is out of tune, NFC antenna monitor circuit can work in concert with the CPU 716 to vary one or parameters such as capacitance, voltage, or impendence of the antenna 745 to tune the NFC antenna 745. The antenna 745 along with transmitter-receiver 644 is configured to detect characteristics, such as radiated performance, radiated signal strength, frequencies, etc., via radio communication protocol.

In another example, an EMV interface 736 ("EMV") can allow the PPS 700 to accept Chip and PIN cards follow technical standards more formally known as EMV, after Europay, MasterCard and Visa (EMV). In one implementation, the EMV interface complies with EMV's Level 1, Level 2 and Level 3 certifications. In some instances, CPU 716 receives payment data read by the EMV interface 736 via the card contacts (not shown), or alternatively from a magnetic stripe reader reading payment data from a magnetic stripe card. The payment data received at the CPU 716 is stored, either temporarily or permanently, in memory 714 of the reader 700. The payment data stored in memory can then be transmitted via the NFC antenna 718. The network interfaces 626 may work in conjunction with components explained later.

In other implementations, a plurality of beacon technologies may be used based on specific accuracy or power requirements. Such technologies may be combined based on weight or some other relationship. In yet another implementation, selections may be made based on user preference or availability of the beacon technology at that time. For example, the reader 700 may be configured to provide and detect a plurality of beacons. For example, if a camera is on, a QR code on the client 702B display may be read, for example to pair two payment devices. If only cellular is on, a modem may detect a femtocell may be nearby. The client 702 B, such as a merchant's register or point of sale terminal, may combine data from the multiple beacons and use such data for analysis of transactions over a course of time. For example, the buyer device 702B may be configured to use Wi-Fi RSSI/RTT and BT RSSI/RTT measurements from a first beacon, QR code value from a second beacon, and WiFi RSSI and cellular measurements from a third beacon for accurately identifying and establishing secured connections with the buyer device 702B.

The beacons can be dynamic with data and other beacon parameters changing as per environment or the type of device pairing with the reader 700; in other implementations, the beacons can be static and displayed using LED displays, electronic displays, or the like, described with reference to I/O interface.

In one embodiment, the PPS 700 may also be connected to and/or communicate with entities such as, but not limited to: one or more users, for example users 602A, associated with user input devices 705; one or more users 602A through their respective buyer devices 702B; peripheral devices 710; an internal or external cryptographic processor device 731; and/or a communications network 704.

Communications Network

The network 704 can include any combination of local area and/or wide area networks, using both wired and wireless communication systems. In some embodiments, the network 704 uses standard communications technologies and/or protocols. Thus, the network 704 can include links using technologies such as Ethernet, 802.11, a Wi-Fi, a Bluetooth network; and/or the like worldwide interoperability for microwave access (WiMAX), 3G, 4G, CDMA, digital subscriber line (DSL), etc. Similarly, the networking protocols used on the network 608 may include multiprotocol label switching (MPLS), transmission control protocol/Internet protocol (TCP/IP), hypertext transport protocol (HTTP), and/or file transfer protocol (FTP). Data exchanged over the network 708 can be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec). Additionally, the communication network may be a mesh network. For example, in a wireless local area network (WLAN), network devices may be configured to receive and forward communications which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP.

Clock

Clock 738 may have a crystal oscillator that generates a base signal through the reader's circuit pathways. The clock 738 may be coupled to the system bus 720 and various clock multipliers that increase or decrease the base operating frequency for other components interconnected in the PPS 700.

Power Source

The units 712 may also include a power source 740. The power source 640 may be of any form capable of powering small electronic circuit board devices such as the following power cells or batteries: alkaline, lithium hydride, lithium ion, lithium polymer, nickel cadmium, solar cells, and/or the like. Other types of AC or DC power sources may be used as well. The power source 740 is connected to at least one of the interconnected subsequent components of the PPS 700 thereby providing an electric current to all subsequent components. In one example, the power source 740 is connected to the system bus 704. In an alternative embodiment, an outside power source 740 is provided through a connection across the I/O 722 interface. For example, a USB connection can carry both data and power across the connection and is therefore a suitable source of power. To this end, coupled to power source 740 may be a USB micro interface (not shown) configured to receive a USB micro jack, although other types of connectors are anticipated. In certain embodiments, connection of a jack to USB micro interface can activate a switch within power source 740 to override power supplied by the battery. This allows for battery power to be conserved for situations where external power cannot be provided. Furthermore, power source 740 may also include a battery charger to allow the battery to be charged when external power is supplied via USB micro interface.

In one implementation, the power source 740 may include a selector (not shown) to selectively power one or more units within the PPS 700. For example, the power source 740 may power the BLE network interface and BLE component and power the CPU 716 only on receiving a wake up signal, using an activation signal, triggered by a tactile, visual, or audio input. To this end, the PPS 700 may include wake-up electronics (not shown) configured to wake-up the PPS 700 from a low-power state to an active state in response to detection of a payment object. In some embodiments, wake-up electronics can also power down PPS 700 to a low-power state after a predetermined amount of time or after completion of a communication.

Cryptographic Processor

A cryptographic processor 642 and/or transceivers (e.g., ICs) 644 may be connected to the system bus 620. In another embodiment, the cryptographic processor and/or transceivers may be connected as either internal and/or external peripheral devices 610 via the I/O interface bus 622. To this end, the transceivers 644 may be connected to antenna(s) 645, thereby enabling wireless transmission and reception of various communication and/or sensor protocols. For example the antenna(s) may connect to a transceiver chip or a wireless microcontroller targeting Bluetooth applications, e.g., providing 802.11n, Bluetooth 4.2, Bluetooth 2.1+EDR, FM, GSM/EDGE/GPRS/2G/3G/HSDPA/HSUPA/LTE (4G) communications, global positioning system (GPS) thereby allowing PPS 700 to determine its location, for example. A separate GPS unit 746 (also referred to as the location component) may be used to determine the location of a merchant or buyer performing a payment transaction using a payment card. The GPS unit may work on any of the protocols mentioned above. The location information may be used to advertise location specific information to the user.

Furthermore, the communicative instructions may be stored and/or transmitted in batches (e.g., batches of instructions) as programs and/or data components to facilitate desired operations.

Peripheral Devices

Peripheral devices 710 may be connected and/or communicate to I/O interface 722 and/or other facilities of the like such as network interfaces, storage interfaces, directly to the interface bus 718, system bus, the CPU, and/or the like. Peripheral devices 710 may be external, internal and/or part of the PPS 700. Peripheral devices 710 may include: antenna, audio devices (e.g., line-in, line-out, microphone input, speakers, etc.), cameras (e.g., still, video, webcam, etc.), dongles (e.g., for ensuring secure transactions with a digital signature, and/or the like), external processors (for added capabilities; e.g., crypto devices 731), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like.

The card reader 700 may comprise user interfaces, such as, for example, a PC/SC EMV L1/L2/NFC certified Smart Card Reader, a keypad for PIN entry, such as key keypad, a display, such as the illustrated LCD display, etc., and electrical interfaces, an interface for back-up battery power, an interface for a display, a power interface, LED lights for indicating status of a transaction, a buzzer, etc. The card reader may be, for example, PCI v3 compliant and configured to facilitate the acceptance of credit/debit card payments.

A sensor 790 may be included. In some embodiments, the sensor 790 may include accelerometers, antenna decouplers, signal generator, signal modification and conditioning components to detect certain characteristics of neighboring devices. The characteristics are generally physical, mechanical or design related. The sensor 790 is also capable of sending and receiving signals or test parameters, the parameters are then compared internally to determine whether the values correspond to a known device.

Peripheral devices 710 may also include sensors, devices, and subsystems can be coupled to network interface to facilitate multiple functionalities. For example, motion sensor, magnetic, light sensor, and proximity sensor can be coupled to network interface to facilitate orientation, detection, lighting, and proximity functions of the PPS 700, by analyzing any input, such as audio, visual, tactile, mechanical, electrical, magnetic, hydraulic, electromagnetic input, and the like. Location processor (e.g., GPS receiver similar to GPS 646) can be connected to the network interface to provide geo-positioning. Motion sensor can include one or more accelerometers configured to determine change of speed and direction of movement of the PPS 700. Magnetic sensors may detect presence or absence of a payment card and differentiate a payment card from other cards.

Peripheral devices 710 may also include a camera subsystem and an optical sensor, e.g., a charged coupled device (CCD) or a complementary metal-oxide semiconductor (CMOS) optical sensor, can be utilized to facilitate camera functions, such as recording photographs and video clips.

Peripheral devices 710 may also include an audio subsystem can be coupled to a speaker and a microphone to facilitate voice-enabled functions, such as voice recognition, voice replication, digital recording, and telephony functions. Audio subsystem can be configured to receive voice commands from the user.

Peripheral devices 710 may also include an I/O subsystem that can include touch surface controller and/or other input controller(s). Touch surface controller can be coupled to a touch surface or pad. Touch surface and touch surface controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface. Touch surface can include, for example, a touch screen.

Other input controller(s) can be coupled to other input/control devices, such as one or more buttons, rocker switches, thumb-wheel, infrared port, USB port, and/or a pointer device such as a stylus. The one or more buttons (not shown) can include an up/down button for volume control of speaker and/or microphone.

In one implementation, a pressing of the button for a first duration may disengage a lock of the touch surface; and a pressing of the button for a second duration that is longer than the first duration may turn power to PPS controller 100 on or off. The user may be able to customize a functionality of one or more of the buttons. The touch surface can, for example, also be used to implement virtual or soft buttons and/or a keyboard. The touch surface may also activate the PPS controller to actively relay information. At all other times, the reader 700 may be dormant to conserve power.

User input devices 705 often are a type of peripheral device 710 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like. The card readers, as mentioned before, may be configured to read a variety of payment cards. Such card readers may either be dongle like or puck style.

Cryptographic units such as, but not limited to, microcontrollers, processors 716, interfaces 718, and/or devices 731 may be attached, and/or communicate with the PPS 700. Cryptographic units support the authentication of communications from interacting agents, as well as allowing for anonymous transactions. Cryptographic units may also be configured as part of the CPU.

It should be noted that although user input devices 705 and peripheral devices 710 may be employed, the PPS 700 may be embodied as an embedded, dedicated, and/or monitor-less (i.e., headless) device(s), wherein access would be provided over a network interface connection. Additionally, part or all peripheral devices may be integrated within the PPS 700.

Memory

Memory 714 may further include, but is not limited to, one or more components 748 that include programs that supplement applications or functions performed by the PPS 700, database 750, operating system 752, random access memory (RAM) 754, read only memory (ROM) 756, and storage device 730, etc., into which data may be saved that serves, amongst other things, as repository for storing data pertinent to functioning of the components.

The PPS 700 may employ various forms of memory 614, such as ROM 754, and a storage device 730. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like.

PPS Components

The memory 714 may contain a collection of program and/or database components and/or data such as, but not limited to: operating system component(s) 752 (operating system); information server component(s) 758 (information server); user interface component(s) 708 (user interface); Web browser component(s) 760 (Web browser); database(s) 750; cryptographic server component(s) 762 (cryptographic server); the component(s) 748; and/or the like (i.e., collectively a component collection). These components 748 may be stored and accessed from the storage devices and/or from storage devices accessible through an interface bus 718.

Operating System

The operating system component 752 is an executable program component facilitating the operation of the PPS 700. The operating system can facilitate access of I/O, network interfaces, peripheral devices, storage devices, and/or the like. In various embodiments, any number of current or future operating systems may be supported such as: any highly fault tolerant, scalable, portable, ROM-able, real-time, deterministic, multitasking and secure kernels systems, e.g., µC/OS-III, µC/OS-III, Apple Macintosh OS X (Server); Unix and Unix-like system distributions; Linux distributions; limited and/or less secure operating systems, e.g., AppleMacintoshOS, MicrosoftWindows XP, Windows Server2003, Windows Server 2008, Windows Server2012, Windows Vista®, Windows 7, and Windows 8, Blackberry OS (e.g., Blackberry 10), Firefox OS, Sailfish OS, Tizen, Ubuntu Touch OS, Chrome OS, iPhone OS (e.g. iOS), WindowsMobile (e.g. Windows 10 Mobile), Google Android (e.g. Lollipop 5.1); and/or the like. In various embodiments of the present subject matter, the operating system may be a multi-threaded multi-tasking operating system. Accordingly, inputs and/or outputs from and to a display and inputs/or outputs to physical sensors may be processed in parallel processing threads. In other embodiments, such events or outputs may be processed serially, or the like. Inputs and outputs from other functional blocks may also be processed in parallel or serially, in other embodiments, such as image acquisition device and physical sensors.

The operating system 752 may provide communications protocols that allow the PPS 700 to communicate with other entities through a communications network 713. Various communication protocols may be used by the PPS 700 as a subcarrier transport mechanism for interaction, such as, but not limited to: multicast, TCP/IP, UDP, unicast, and/or the like.

Information Server

The information server 758 may: support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols; provide results in the form of Web pages to Web browsers; and allows for the manipulated generation of the Web pages through interaction with other program components.

Web Browser

A Web browser component 760 is a stored program component that is executed by a CPU. The Web browser may be a hypertext viewing application such as Google Chrome or Macintosh Safari. Web browsers and like information access tools may be integrated into PDAs, cellular telephones, and/or other mobile devices. Also, in place of a Web browser and information server, a combined application may be developed to perform similar operations of both. The combined application would similarly affect the obtaining and the provision of information to users, user agents, and/or the like from the enabled nodes. The web browser may be coupled to a web server (not shown). In other implementations, the PPS 700 may host a website (hereinafter, "system website") that includes one or more graphical user interfaces (GUIs) for organizing and presenting content to users. For example, through the system website, users create account logins to connect to their social identities (e.g., social profiles or social accounts), read content (e.g., messages, comments, posts), create or post content, communicate in real-time with other users (e.g., chat), and/or otherwise engage or interact with other users of the system website (e.g., "friends," "followers," "social contacts," or other types of social network connections). In some embodiments, the user interactions on the system website lead to internal API communication, which involves the PPS 700 monitoring the user interactions for an indication of an intent to transfer money, sending, in response to such indication, requests (e.g., POST or GET requests) to the API of the server(s) to query the database(s) 750, and displaying the data returned by the API of the server(s) as appropriate. The indication of the intent is determined may be based on an identification of a user input, e.g., a string of characters, that has a particular syntax, the syntax being a monetary indicator preceding one or more alphanumeric characters. The user input having the syntax operates as a trigger to send money to a payment proxy represented by the user input.

User Interface

The user interface 708 may allow for the display, execution, interaction, manipulation, and/or operation of program components and/or system facilities through textual and/or graphical facilities through one or more interaction interface elements, such as check boxes, cursors, menus, scrollers, and windows (collectively and commonly referred to as widgets) to facilitate the access, capabilities, operation, and display of data and computer hardware and operating system resources, and status. Graphical user interfaces (GUIs) 708 may be used to provide a baseline and means of accessing and displaying information graphically to users. The user interface may also be a graphic user interface as provided by, with, and/or atop operating systems and/or operating environments such as already discussed.

Cryptographic Server

A cryptographic server component 762 is a stored program component that is executed by a CPU 716, cryptographic processor 742, cryptographic processor interface 728, cryptographic processor device 731, and/or the like, to enable encryption schemes allowing for the secure transmission of information across a communications network to enable the PPS components to engage in secure transactions. The cryptographic server 762 facilitates the secure accessing of resources on the PPS and facilitates the access of secured resources on remote systems; i.e., it may act as a client and/or server of secured resources. Cryptographic processor interfaces 728 can allow for expedition of encryption and/or decryption requests by the cryptographic component. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Secure Socket Layer (SSL), Secure Hypertext Transfer Protocol (HTTPS), and/or the like. Employing such encryption security protocols, the PPS 700 may encrypt all incoming and/or outgoing communications.

The PPS 700 may be associated with a secure enclave unit (not shown) that may represent any logic, circuitry, hardware, or other structures for creating and maintaining a secured, protected, or isolated environment, in which an application or other software may run, execute, be loaded, or otherwise be present an information processing system. The secure enclave unit may further include encryption unit (not shown), which may include any logic, circuitry, or other hardware to execute any one or more encryption algorithms and the corresponding decryption algorithms, and may include logic, circuitry, or other hardware shared with another encryption unit in processor. In one embodiment, the secure enclave unit includes the digital signatures, and biometric payment instruments created thereof.

Database

The database component 750 may be a fault tolerant, relational, scalable, secure database, such as Oracle or Sybase. Alternatively, the database 750 may be implemented using various data-structures, such as an array, hash, (linked) list, struct, structured text file (e.g., XML), table, and/or the like. Such data-structures may be stored in memory and/or in structured files. In another alternative, an object-oriented database may be used. Also, the database may be implemented as a mix of data structures, objects, and relational structures.

In one embodiment, the database 750 includes several data tables 750A-E. A transaction data table 750A includes fields such as, but not limited to: transaction information, service code, POS entry code, CVV, CVV2, and/or the like. A transaction count data table 750B includes fields such as, but not limited to: transaction count threshold, transaction count, transaction count condition, transaction count exception. A connection status data table 750C includes fields such as, but not limited to: location coordinates, connection status, EMV status, magstripe status, NFC status, communication channel, open communication port, and the like. An alert data table 750D includes fields such as, but not limited to: messages sent, messages received, links generated, etc. An other data table 750E includes fields such as, but not limited to: authorization flag, rejection flag, and the like.

In one embodiment, specific tables may be created when each of the components are executed. Furthermore, the tables may be stored temporarily or permanently in the database 750.

Components

The component(s) 748 is a stored program component that is executed by the CPU 716. In one embodiment, the PPS component 748 incorporates any and/or all combinations of the aspects of the PPS 700 that was discussed in the previous figures. As such, the PPS 700 affects accessing, obtaining and the provision of information, services, transactions, and/or the like across various communications networks.

Examples of components include, but are not limited to, transaction analysis component(s) 764, Authorization component(s) 766, POS component(s) 768, location component 770, Technical Fallback component 771, Device Detection Component 772, mapping component(s) 774, and other component(s) 776. The transaction analysis component 764 receives data from POS terminals and determines whether to allow or reject payment transactions. The authorization component 766 may allow and enable the PPS 700 to accept the payment instruments in the correct readers. The POS component 768 may allow and enable the PPS 700 to accept payment object data, e.g., from the credit card or NFC based payment methods, and process or transfer the transaction data to an external server, such as a payment processing system and financial network system, to obtain financial account information of users to fulfill a transaction. The location component(s) 770 tracks the user's mobile device and the merchant point of sale device to push information based on proximity through for example, short-range communication networks, such as Bluetooth, BLE, and NFC technologies. The technical fallback component 671 allows and enables the PPS 700 to institute technical fallback by creating APIs such as determining which protocols or ports are available in proximate devices, which devices are proximate, for creating receipts, associating rewards, recording loyalty points, applying technical fallback, etc.

The device detection component 772 detects devices such as POS terminal and readers surrounding a specific POS terminal or in communication with the PPS 700. The device detection component 772 can encrypt the data obtained from the devices based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key).

The device detection component 772 can also create the digital signature or an encrypted fingerprint using other schemes, such as fuzzy vault algorithm, a cancelable fuzzy vault scheme based on irreversible hash functions, fingerprint minutiae algorithms based on a thinned fingerprint image as opposed to an original fingerprint image using hash functions, such as hash functions, such as MD, RIPEMD, and SHA. The mapping component(s) 774 may allow and enable the PPS 700 to map the payment objects to customers and merchant locations.

The structure and/or operation of any of the PPS 700 components may be combined, consolidated, and/or distributed in any number of ways to facilitate development and/or deployment. To this end, one may integrate the components into a common code base or in a facility that can dynamically load the components on demand in an integrated fashion. The components may be consolidated and/or distributed in countless variations through standard data processing and/or development techniques. Multiple instances of any one of the program components may be instantiated on a single node, and/or across numerous nodes to improve performance through load-balancing and/or data-processing techniques. Furthermore, single instances may also be distributed across multiple controllers and/or storage devices; e.g., databases.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components. The grammar syntax itself may be presented as structured data that is interpreted and/or otherwise used to generate the parsing mechanism. Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

Regarding the process 300, 400, and 500 while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further, any specific numbers noted herein are only examples; alternative implementations can employ differing values or ranges.

While aspects of the described subject matter can be implemented in any number of different systems, circuitries, environments, and/or configurations, the embodiments are described in the context of the following exemplary system(s) and configuration(s). The descriptions and details of well-known components are omitted for simplicity of the description. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof. Some recurring terms are now described. These definitions should not be considered limiting.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, note that the terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

In some implementations, the network(s) may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks may include both wired and/or wireless communication technologies, including Bluetooth®, Bluetooth® low energy, Wi-Fi and cellular communication technologies like worldwide interoperability for microwave access (WiMAX), 3G, 4G, CDMA, digital subscriber line (DSL), etc., cloud computing technologies, as well as wired or fiber optic technologies. Additionally, the communication network may be a mesh network. For example, in a wireless local area network (WLAN), network devices may be configured to receive and forward communications which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

The term "component," "module" or "engine" refers broadly to general or specific-purpose hardware, software, or firmware (or any combination thereof) components. Components and engines are typically functional components that can generate useful data or other output using specified input(s). A component or engine may or may not be self-contained. Depending upon implementation-specific or other considerations, the components or engines may be centralized or functionally distributed. An application program (also called an "application") may include one or more components and/or engines, or a component and/or engine can include one or more application programs.

What is claimed is:

1. A method comprising:
receiving, by one or more servers associated with a payment processing service (PPS) and from an application provided by the one or more servers of the PPS and executing on a point-of-sale (POS) device at a physical location associated with a merchant, data corresponding to a payment object associated with a pending payment transaction occurring in-person between the merchant and a customer at the physical location of the POS device;

receiving, by the one or more servers and from the application, a connection status identifier, wherein the connection status identifier is an assigned value identifying which of a plurality of payment mechanisms the POS device is currently capable of communicating with for performing the pending payment transaction;

based at least in part on the connection status identifier and the data corresponding to the payment object, determining, by the one or more servers, that the PPS allows the application to use a first payment mechanism of the plurality of payment mechanisms to perform the pending payment transaction when the POS device is concurrently capable of communicating with a second payment mechanism of the plurality of payment mechanisms; and upon at least partly responsive to determining that the PPS allows the application to use the first payment mechanism when the POS device is concurrently capable of communicating with the second payment mechanism, causing, by the one or more servers, the application to perform the pending payment transaction using the first payment mechanism.

2. The method as claim 1 recites, wherein a type of the first payment mechanism comprises at least one of a magnetic stripe card reader, an optical scanner, an Europay-MasterCard-Visa (EMV)-compliant card reader, a near-field communication (NFC) enabled reader, or a radio frequency identification (RFID) reader.

3. The method as claim 2 recites, wherein a type of the second payment mechanism comprises at least one of a magnetic stripe card reader, an optical scanner, an EMV-compliant card reader, a NFC enabled reader, or a RFID reader, and wherein the type of the second payment mechanism is exclusive of the type of the first payment mechanism.

4. The method as claim 3 recites, wherein the type of the first payment mechanism is associated with a first level of a hierarchy of preferred payment mechanisms and the type of the second payment mechanism is associated with a second level of the hierarchy, and
wherein the second level is preferred over the first level to perform the pending payment transaction.

5. The method as claim 1 recites, wherein determining that the PPS allows the application to use the first payment mechanism to perform the pending payment transaction when the POS device is concurrently capable of communicating with the second payment mechanism is based at least in part on an allowance criterion.

6. The method as claim 5 recites, wherein the allowance criterion is extracted from a database.

7. The method as claim 5 recites, wherein the allowance criterion is received from an issuer of the payment object.

8. The method as claim 5 recites, wherein the allowance criterion comprises a technical fallback rule.

9. The method as claim 1 recites, further comprising:
receiving, by the one or more servers, data regarding a quantity of failed attempts to read the payment object using the second payment mechanism, wherein determining that the PPS allows the application to use the first payment mechanism when the POS device is concurrently capable of communicating with the second payment mechanism is based at least in part on a determination that the quantity of failed attempts satisfies a criterion.

10. The method as claim 9 recites, further comprising determining, by the one or more servers and based at least in part on the physical location of the POS device and the quantity of failed attempts to read the payment object using the second payment mechanism, whether the POS device is defective or a fraudulent attempt at forcing the application to perform the pending payment transaction using the first payment mechanism instead of the second payment mechanism has occurred.

11. The method as claim 1 recites, wherein the data corresponding to the payment object includes information regarding which payment mechanisms of the plurality of payment mechanisms are compatible with the payment object, and wherein determining that the PPS allows the application to use the first payment mechanism when the POS device is concurrently capable of communicating with the second payment mechanism is based at least in part on determining that the payment object is incompatible with the second payment mechanism.

12. The method as claim 1 recites, wherein the pending payment transaction occurring in-person between the merchant and the customer at the physical location of the POS device further comprises physical provisioning of the payment object by the customer.

13. A method comprising:
determining, by an application executing on a point-of-sale (POS) device at a physical location associated with a merchant, a connection status identifier, wherein the connection status identifier is an assigned value identifying which of a plurality of payment mechanisms the POS device is currently capable of communicating with for performing a pending payment transaction occurring in-person between the merchant and a customer at the physical location of the POS device, wherein the connection status identifier indicates that the plurality of payment mechanisms includes at least a first payment mechanism and a second payment mechanism;

determining, by the application, information corresponding to a payment object associated with the pending payment transaction;

transmitting, by the application to one or more servers of a payment processing service (PPS), the connection status identifier identifying which of the plurality of payment mechanisms the POS device is currently capable of communicating with and the information corresponding to the payment object;

receiving, by the application and from the one or more servers of the PPS, an indication that the PPS allows the application to use the first payment mechanism to perform the pending payment transaction when the POS device is concurrently capable of communicating with the second payment mechanism; and based at least in part on the indication that the PPS allows the application to use the first payment mechanism when the POS device is concurrently capable of communicating with the second payment mechanism, processing, by the application, the pending payment transaction with the first payment mechanism.

14. The method as claim 13 recites, wherein the value of the connection status identifier is generated by the POS device.

15. The method as claim 13 recites, wherein the application comprises a POS application.

16. The method as claim 13 recites, wherein a type of the first payment mechanism comprises at least one of a magnetic stripe card reader, an optical scanner, an Europay-MasterCard-Visa (EMV)-compliant card reader, a near-field communication (NFC) enabled reader, or a radio frequency identification (RFID) reader.

17. The method as claim 16 recites, wherein a type of the second payment mechanism comprises at least one of a magnetic stripe card reader, an optical scanner, an EMV-compliant card reader, an NFC enabled reader, or a RFID reader, and wherein the type of the second payment mechanism is exclusive of the type of the first payment mechanism.

18. A method comprising:
- determining, by an application executing on a point-of-sale (POS) device at a physical location associated with a merchant, a connection status identifier, wherein the connection status identifier is an assigned value identifying which of a plurality of payment mechanisms the POS device is currently capable of communicating with for performing a pending payment transaction occurring in-person between the merchant and a customer at the physical location of the POS device;
- determining, by the application, that a payment object associated with the pending payment transaction was read by a first payment mechanism of the plurality of payment mechanisms;
- based at least in part on determining the connection status identifier and determining that the payment object was read by the first payment mechanism, determining, by the application, that a payment processing service (PPS) allows the application to use the first payment mechanism to perform the pending payment transaction when the POS device is concurrently capable of communicating with a second payment mechanism of the plurality of payment mechanisms; and
- upon determining that the PPS allows the application to use the first payment mechanism when the POS device is concurrently capable of communicating with the second payment mechanism, performing, by the application, the pending payment transaction using the first payment mechanism.

19. The method as claim 18 recites, wherein determining that the PPS allows the application to use the first payment mechanism to perform the pending payment transaction is based at least in part on an allowance criterion.

20. The method as claim 19 recites, wherein the allowance criterion is received from an issuer of the payment object.

\* \* \* \* \*